(12) United States Patent
Schmidt et al.

(10) Patent No.: US 8,891,396 B2
(45) Date of Patent: Nov. 18, 2014

(54) COMMUNICATION DEVICE, MOBILE TERMINAL, METHOD FOR REQUESTING INFORMATION AND METHOD FOR PROVIDING INFORMATION

(71) Applicant: Intel Mobile Communications GmbH, Neubiberg (DE)

(72) Inventors: Andreas Schmidt, Braunschweig (DE); Maik Bienas, Braunschweig (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/658,840

(22) Filed: Oct. 24, 2012

(65) Prior Publication Data

US 2014/0113656 A1   Apr. 24, 2014

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........ 370/252; 370/241; 455/67.11; 455/423; 455/452.2; 455/456.2

(58) Field of Classification Search
None
See application file for complete search history.

(56) References Cited

U.S. PATENT DOCUMENTS

| 8,380,234 | B2 * | 2/2013 | Kronander et al. | 455/509 |
|---|---|---|---|---|
| 8,687,567 | B2 * | 4/2014 | Chen et al. | 370/329 |
| 8,724,497 | B2 * | 5/2014 | Johansson et al. | 370/252 |
| 2011/0201279 | A1 * | 8/2011 | Suzuki et al. | 455/67.11 |
| 2011/0287793 | A1 * | 11/2011 | Tenny et al. | 455/507 |
| 2012/0071174 | A1 * | 3/2012 | Bao et al. | 455/456.3 |
| 2012/0082051 | A1 * | 4/2012 | Kim et al. | 370/252 |
| 2012/0220291 | A1 * | 8/2012 | Olsson et al. | 455/423 |
| 2013/0114446 | A1 * | 5/2013 | Liu et al. | 370/252 |
| 2013/0178211 | A1 * | 7/2013 | Wang et al. | 455/436 |
| 2013/0189973 | A1 * | 7/2013 | Chang et al. | 455/423 |
| 2013/0203406 | A1 * | 8/2013 | Chuang | 455/424 |
| 2013/0242785 | A1 * | 9/2013 | Guo | 370/252 |
| 2014/0044002 | A1 * | 2/2014 | Fujishiro | 370/252 |
| 2014/0056169 | A1 * | 2/2014 | Jung et al. | 370/252 |
| 2014/0066107 | A1 * | 3/2014 | Schmidt et al. | 455/458 |
| 2014/0128057 | A1 * | 5/2014 | Siomina et al. | 455/423 |

OTHER PUBLICATIONS

3GPP TR 36.805 V9.0.0 (Dec. 2009) 3rd Generation Partnership Project; Technical Specification Group Radio Access Network; Study on Minimization of drive-tests in Next Generation Networks; (Release 9); pp. 1-24.

(Continued)

*Primary Examiner* — Magdi Elhag
(74) *Attorney, Agent, or Firm* — Schwabe Williamson & Wyatt, P.C.

(57) ABSTRACT

A communication device is provided comprising a message generator configured to generate a message indicating that a mobile terminal is to determine a list of locations at which the mobile terminal has detected a need for a data communication with a mobile communication network and to transmit the determined list of locations to the mobile communication network and a transmitter configured to transmit the message.

27 Claims, 8 Drawing Sheets

(56) References Cited

OTHER PUBLICATIONS

3GPP TS 37.320 V10.4.0 (Dec. 2011) 3rd Generation Partnership Project;Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10); pp. 1-18.

3GPP TS 36.300 V10.7.0 (Mar. 2012) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-194.

3GPP TS 36.331 V10.5.0 (Mar. 2012) 3rd Generation Partnership Project; Technical Specification Group Radio Access Network; Evolved Universal Terrestrial Radio Access (E-UTRA); Radio Resource Control (RRC); Protocol specification (Release 10); pp. 1-302.

3GPP TS 32.422 V10.7.0 (Mar. 2012) 3rd Generation Partnership Project; Technical Specification Group Services and System Aspects; Telecommunication management; Subscriber and equipment trace; Trace control and configuration management (Release 10); pp. 1-119.

3GPP TS 36.413 V10.5.0 (Mar. 2012) 3rd Generation Partnership Project; Technical Specification Group Radio Access Network; Evolved Universal Terrestrial Radio Access Network (E-UTRAN); S1 Application Protocol (S1AP) (Release 10); pp. 1-225.

International Search Report in related PCT/EP2013/071311, mailed Mar. 3, 2014, 5 pages.

Samsung, "On the Reporting the Failed RRC Connection Establishment", 3GPP TSG RAN WG2 #77bis, Jeju Island, Korea, Mar. 26-30, 2012, 4 pages.

Vodafone, "Mapping Traffic vol. within a Cell", 3GPP TSG RAN WG2 #75bis, Zhuhai, China, Oct. 10-14, 2011, 7 pages.

Itri, "Consideration on Accessibility Measurement Reporting", 3GPP TSG-RAN WG2 #79, Qingdao, China, Aug. 13-17, 2012, 5 pages.

Samsung, "Discussion on Traffic Hot Spot Discovery", 3GPP TSG-RAN WG2 Meeting #77, Dresden, Germany, Feb. 6-10, 2012, 3 pages.

Kyocera, "MDT Accessibility measurement, logging and reporting", 3GPP TSG-RAN WG2 #78, Prague, Czech Republic May 21-25, 2012, 4 pages.

* cited by examiner

US 8,891,396 B2

COMMUNICATION DEVICE, MOBILE TERMINAL, METHOD FOR REQUESTING INFORMATION AND METHOD FOR PROVIDING INFORMATION

TECHNICAL FIELD

The present disclosure relates to a communication device, a mobile terminal, a method for requesting information and a method for providing information.

BACKGROUND

For an operator of a mobile communication network information about the communication behavior of the users of the mobile communication network is important for network optimization and network planning, e.g. for the decision regarding the deployment of additional base stations. Such information may allow the mobile network operator to improve the provision of communication services for users (subscribers) and thus to improve user experience.

SUMMARY

A communication device is provided including a message generator configured to generate a message indicating that a mobile terminal is to determine a list of locations at which the mobile terminal has detected a need for a data communication with a mobile communication network and to transmit the determined list of locations to the mobile communication network and a transmitter configured to transmit the message.

Further, a mobile terminal is provided including a detector configured to detect whether the mobile terminal has a need for a data communication with a mobile communication network, a determiner configured to determine a list of locations at which the detector has detected a need for data communication with the mobile communication network, a message generator configured to generate a message including the determined list and a transmitter configured to transmit the message.

Additionally, methods according to the above communication device and the above mobile terminal are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

Figure 1:
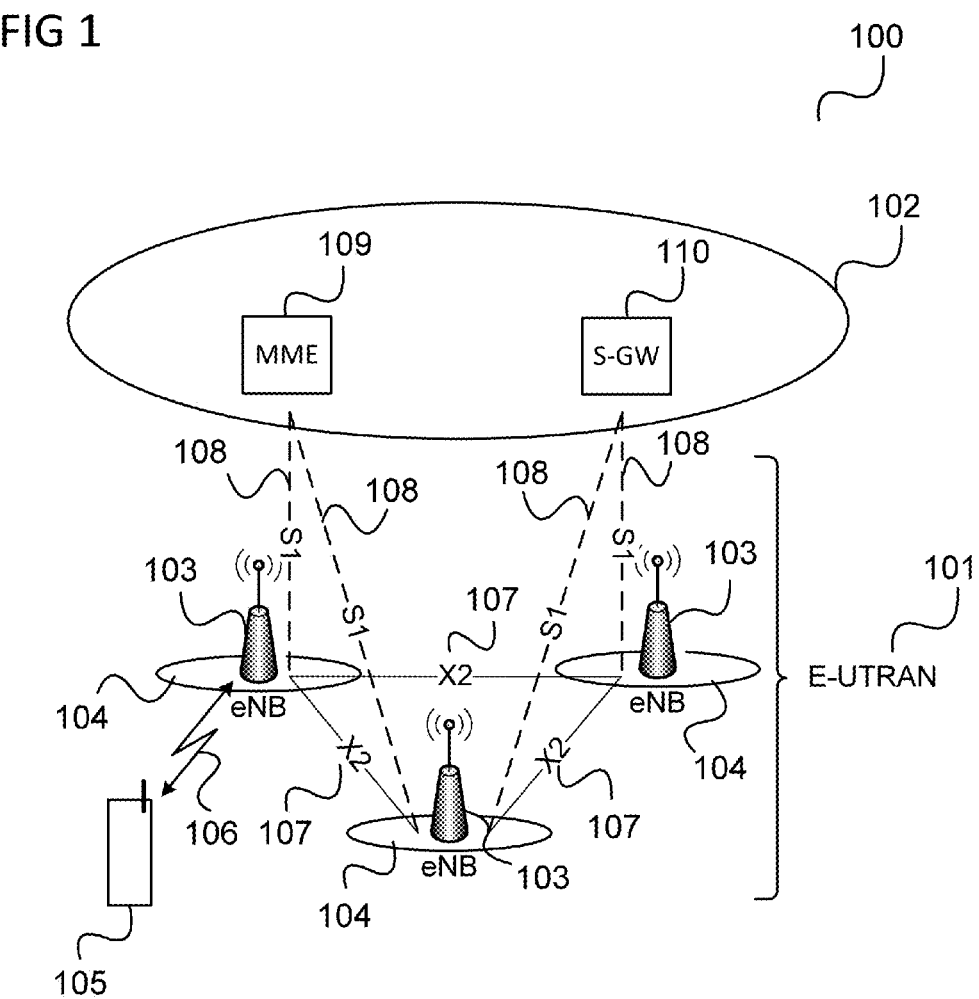
FIG. 1 shows a communication system.

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'. A communication system that may for example be a communication system according to LTE is described in the following with reference to FIG. 1.

FIG. 1 shows a communication system 100.

The communication system 100 is a mobile communication network, e.g. a cellular mobile communication system (also referred to as cellular radio communication network in the following), including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies (RATs). This is illustrated in FIG. 2.

Figure 2:
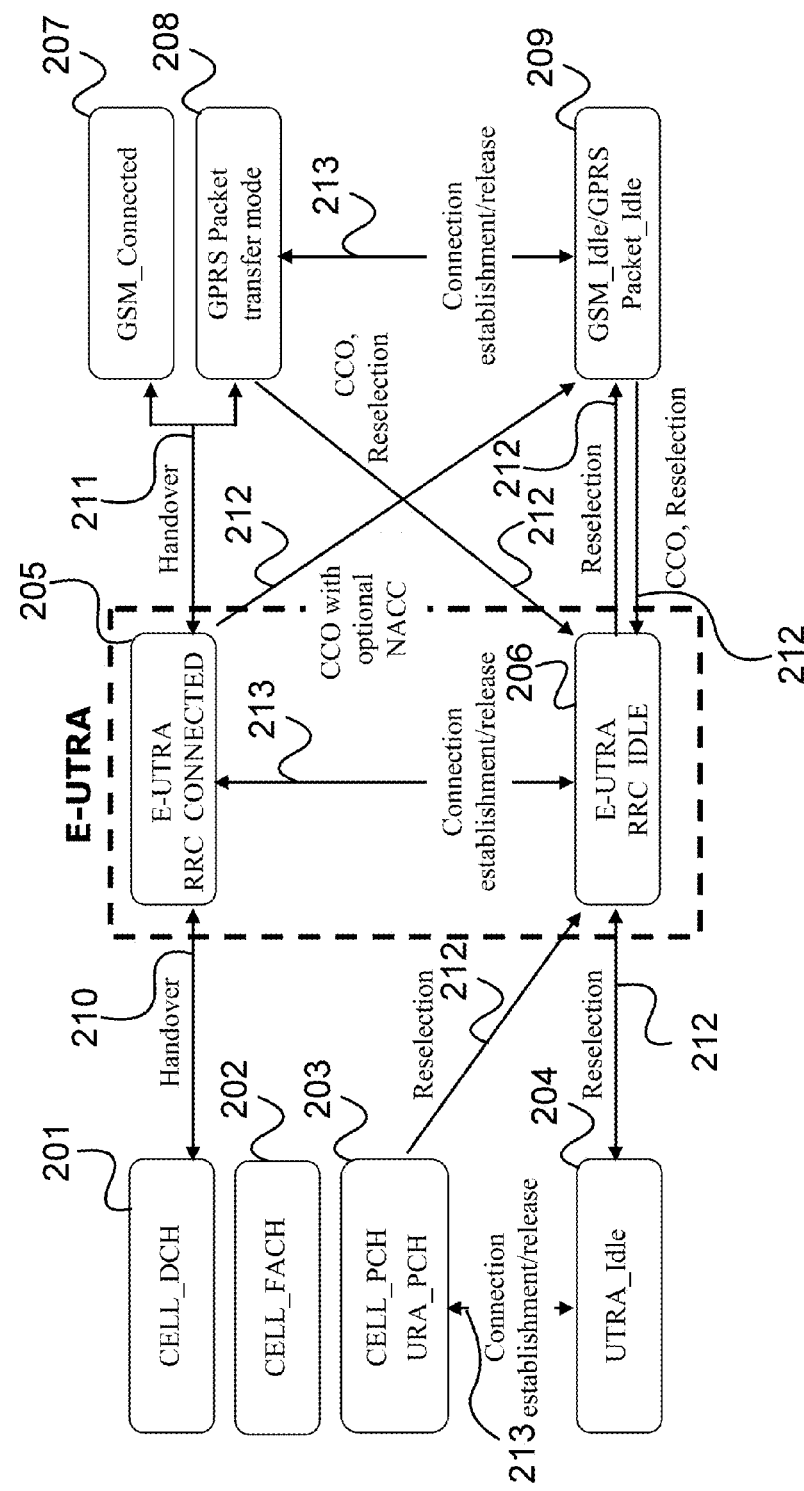
FIG. 2 shows a state diagram.

FIG. 2 shows a state diagram 200.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be characterized as follows:
RRC_IDLE
Mobile terminal specific DRX (Discontinuous Reception) may be configured by upper protocol layers;
Mobility is controlled by the mobile terminal 105;
The mobile terminal 105
may acquire system information (SI);
monitors a paging channel to detect incoming calls and SI change;

performs neighboring cell measurements for the cell (re-)selection process.

RRC CONNECTED

A mobile terminal 105 is in RRC_CONNECTED when an RRC connection has been established.

Transfer of unicast data to/from the mobile terminal 105;

Mobility is controlled by the radio access network 101 (handover and cell change order);

The mobile terminal 105 may be configured with mobile terminal specific DRX (Discontinuous Reception) at lower protocol layers.

The mobile terminal 105 may acquire system information (SI);

monitors a paging channel and/or SIB (system information block) Type 1 content to detect SI change;

monitors control channels associated with the shared data channel to determine if data are scheduled for it;

performs neighboring cell measurements and measurement reporting to assist the network in making handover decisions;

provides channel quality and feedback information to the radio access network 101.

During work on 3GPP Rel-9 (Release 9) a Feasibility Study on Minimization of Drive Tests (MDT) for future LTE and HSPA (High Speed Packet Access) releases was conducted. In brief, the study aimed at assessing the feasibility, benefits and complexity of automating the collection of DL (downlink) signal strength measurements by the UE to minimize the need of conventional (manual) drive tests.

Conventional drive tests may be characterized as follows:

UE-like test equipment is installed in cars and driven around by the Mobile Network Operator's (MNO) personnel and measurements are recorded.

Sometimes additional attenuators are deployed to 'imitate' indoor reception.

The MNO's measurements focus on latency (for both c-plane and u-plane), bit error rates (BER), call drops, and alike.

In contrast to this, MDT (as defined by 3GPP for LTE and HSPA releases starting with Release 10) means:

The Mobile Network Operator (MNO) utilizes his customers' UEs out in the field to find out how bad or good network coverage is at a given location.

The customer is generally not to be informed about ongoing MDT activities in his/her device.

Using conventional (manual) drive tests for network optimization purposes is costly and causes additional $CO_2$ emissions, so it is desirable to develop automated solutions to reduce the operator costs for network deployment and operation. The findings of the study item phase show that it is beneficial to collect UE measurements to enable a more efficient network optimization and it is feasible to use c-plane solutions (of the air interface) to acquire the information from the devices involved.

The key result of the MDT Feasibility Study can be seen in the following: Information collected by UEs pertaining to DL signal strength measurements, together with information available in the Radio Access Network (RAN) can be used by the MNO for network topology planning and coverage optimization purposes.

Detailed technical work on MDT was kicked-off for the 3GPP Rel-10 timeframe with the creation of an MDT Stage 2 description. During this work it became clear that existing measurement configuration methods and measurement reporting methods (defined for Radio Resource Management, RRM) are not sufficient and need to be enhanced to take MDT-specific requirements into account. At that time, the common understanding was that MDT measurements take place in the UE.

For Rel-11, 3GPP is currently in a process of enhancing the MDT functionality. Recently new use cases that are related to UL (Uplink) Coverage Optimizations, QoS Verification and IP Throughput Measurements have been identified. All these new use cases have in common that further measurements for MDT are required in certain CN (Core Network) or RAN (Radio Access Network) nodes (in addition to those measurements that take place in the UE itself).

In order to distinguish the MDT functionalities from the RRM functionalities, the terms MDT Configuration, MDT Measurements (including MDT UE Measurements and MDT NW Measurements), and MDT Reporting are used in the following (e.g. for the messages and information elements being exchanged over the network interfaces S1 108 and over the air interface Uu 106).

MDT Operation Modes on the UE Side

Based on the two RRC States RRC_IDLE and RRC_CONNECTED two types of MDT have been defined.

Immediate-MDT: (defined for UEs in RRC_CONNECTED state):

1. MDT Configuration
   is based on existing RRC signaling procedures
2. MDT Measurements
   are taken immediately
3. MDT Reporting
   is also done immediately Logged-MDT (defined for UEs in RRC_IDLE state):

1. MDT Configuration
   a) is done by dedicated RRC signaling while the UE is in RRC_CONNECTED,
   b) remains valid in RRC_IDLE,
   c) is maintained during multiple RRC_IDLE->RRC_CONNECTED->RRC_IDLE state transitions
   d) is maintained while temporarily being in another RAT
2. MDT Measurements are all done in RRC_IDLE and includes the following
   a) data collection
   b) storage of data
   c) log-file creation (for later submission from UE to E-UTRAN)
3. MDT Reporting
   a) at a later point in time (when UE is back in RRC_CONNECTED again)
   b) upon E-UTRAN request (using UEInformationRequest and UEInformationResponse RRC message pair)

MDT is not supported in wireless communication systems according to the GERAN (2G and 2.5G) suite of specifications, i.e. is not supported for the GSM 207, 208, 209. Immediate-MDT is supported in Cell_DCH 201 and RRC_CONNECTED 205. Logged-MDT is supported in Cell_PCH/URA_PCH 203, UTRA_Idle 204 and RRC_IDLE 206.

MDT Functionality on Network Side (i.e. on the Side of the Core Network (CN) and the Radio Access Network (RAN, e.g. the E-UTRAN))

The core network functionality for the configuration of MDT (including instructions what kind of devices should be selected for MDT measurements by an eNB, and where the collected MDT reports should be sent to) are based on the existing Trace functionality. This is illustrated in FIG. 3.

Figure 3:
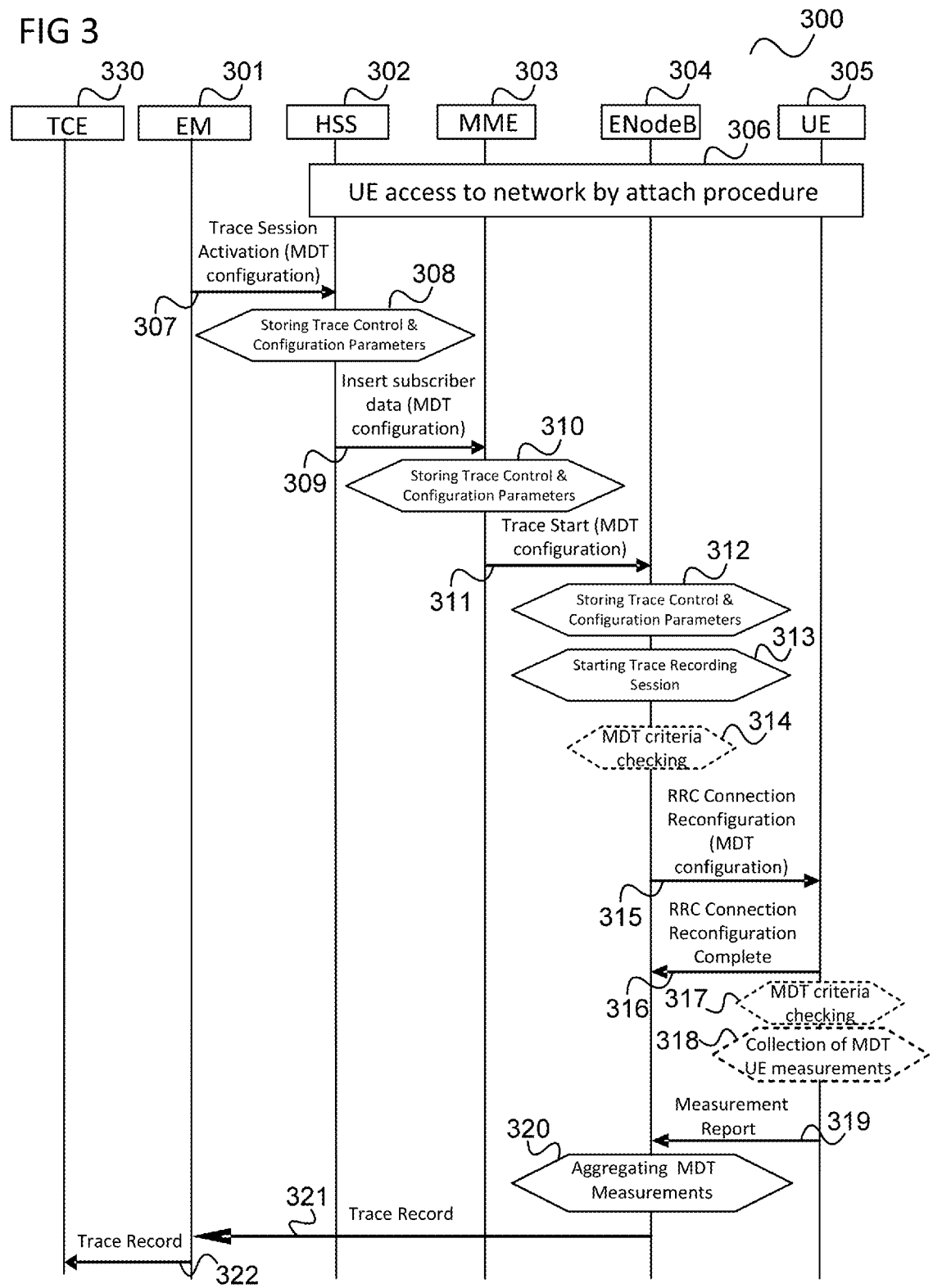
FIG. 3 shows a message flow diagram illustrating Trace-based MDT functionality on the network side.

FIG. 3 shows a message flow diagram 300 illustrating Trace-based MDT functionality on the network side.

The message flow takes place between an element manager (EM) 301, which is for example part of the core network 102, a home subscriber server (HSS) 302, which is for example part of the core network 102, an MME 303 (e.g. corresponding to MME 109), a base station 304 (e.g. corresponding to the eNB 103 serving the UE 105) and a UE 305 corresponding to UE 105. Further, a TCE (Trace Collection Element) 330 may be involved in the flow.

In 306, the UE 305 attaches to the network side (e.g. to E-UTRAN 101 and core network 102) by means of an attach procedure.

In 307, the EM transmits the MDT configuration for the UE 105 to the HSS 302 by means of a Trace Session Activation message.

In 308, the HSS 302 stores trace configuration parameters.
In 309, the HSS 302 forwards the MDT configuration to the MME 303.

In 310, the MME 303 stores the trace configuration parameters.

In 311, the MME 303 transmits the MDT configuration to the base station 304 by means of a trace start message.

In 312, the base station 304 stores the trace configuration parameters.

In 313, the base station 304 starts a Trace Recoding Session.

In 314, the base station 304 may optionally perform MDT criteria checking.

In 315, the base station 304 sends the MDT configuration to the UE 305 (via the air interface).

The UE 305 acknowledges the MDT configuration by means of an RRC Connection Reconfiguration Complete message in 316.

The UE 305 may optionally perform MDT criteria checking in 317.

In 318, the UE 305 performs MDT measurements according to the MDT configuration.

In 319, the UE reports the results of the MDT measurements to the base station 304 by means of a measurement report.

In 320, the base station 304 may store the MDT measurements for later retrieval by the TCE. In this step the base station 304 may also choose to aggregate MDT UE measurements received in a measurement report 319 with MDT NW measurements collected by the base station 304 itself.

In 321 the (aggregated) MDT measurement report is conveyed from the base station 304 to the EM 301.

In case that the TCE 330 is a separate entity from the EM 301, the EM 301 may then forward the (aggregated) MDT measurements to the TCE 330.

According to Rel-10 MDT does not require the base station 304 to measure anything; the only thing that the base station has to do is collect MDT measurements from the UE 305 and use the trace-based MDT reporting mechanisms to convey the MDT report back to the TCE 330 which may for example be an MDT Server. According to Rel-11 some new measurement requirements (related to UL and/or DL traffic characteristics) are put on certain CN or RAN nodes to realize the MDT Rel-11 enhancements (e.g. MDT NW Measurements for UL Coverage Optimizations, QoS Verification and IP Throughput Measurements).

In order to distinguish the MDT messages that are exchanged over the air interface form those MDT messages that are exchanged between core network entities, the following terms are used in the following to refer to messaging within the core network:

Trace-based MDT Configuration, and
Trace-based MDT Reporting.

In order to distinguish the MDT measurements that take place in the UE from those MDT measurements that take place in the CN and/or certain RAN nodes, the following two terms are used in the following:

MDT UE Measurements to refer to measurements for MDT performed by the UE, and

MDT NW Measurements to refer to measurements for MDT performed by certain CN or RAN nodes, primarily measurements of UL and/or DL data transmissions to address the new use cases in Rel-11.

While examples are given in the following based on E-UTRA (i.e. LTE) and in most examples LTE terminology is used, it should be noted that the principles can also be adapted to the HSPA (i.e. UMTS) suite of standards. Physical layer parameters of the uplink radio access (as required for the UL Coverage Optimization use case) can be measured by the respective base station in both UMTS and LTE. However, because of the different protocol termination points in LTE and UMTS, it is not suitable to just replace "eNB" with "NB" when it comes to "higher layer" measurements for QoS Verification, IP Throughput Measurement, and alike. In HSPA these types of "higher layer" measurements (e.g., at application layer) can for example only be done in the RNC.

MDT enhancements can be expected to continue in 3GPP during work on Rel-12.

Current MDT functions only allow detection of locations where traffic is conveyed over the air. These locations are not necessarily the same locations in which traffic is actually generated in a mobile terminal by the user or some service/application, or where a need of the mobile terminal for traffic consumption arises. Reasons for this can be Lack of coverage, i.e. the mobile terminal has for example no chance to connect to the wireless communication network when it would have a need for communication;

Delay until (e.g. RRC) a connection is up and running, i.e. the mobile terminal has for example to remain in idle mode (e.g. RRC_IDLE) for a relatively long time or access baring mechanisms apply; and Buffer overload problems in the mobile terminal's uplink data buffer (which may be applicable even for a UE that already resides in RRC_CONNECTED).

For example, a communication device and a mobile terminal are provided that address the use case of "Traffic Hot Spot Detection". A "Traffic Hot Spot" may be understood as a (geographical) location where data is actually generated or requested in a mobile terminal, e.g. by a user, or by a certain application or service, in other words where the mobile terminal has a need for data communication (and detects the need for a data communication). The user may be unaware of the applications' or services' need(s).

Figure 4:
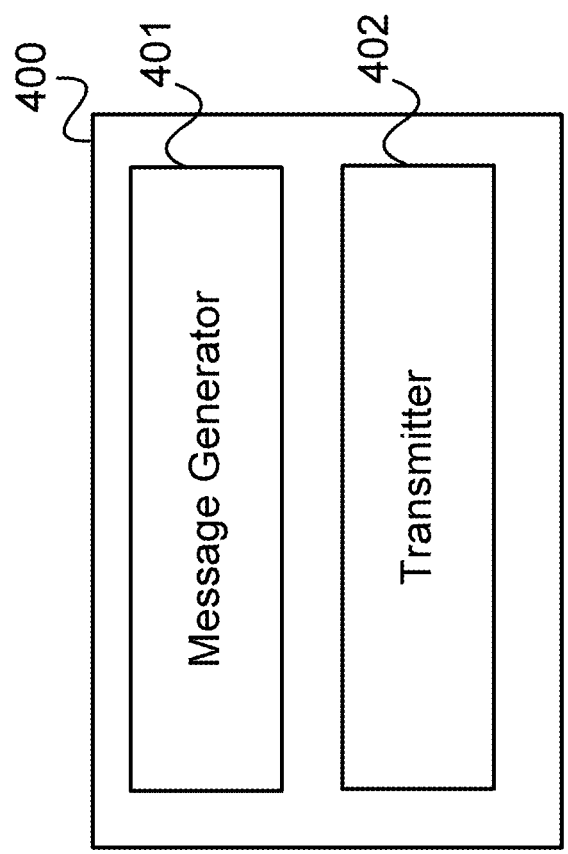
FIG. 4 shows a communication device requesting information.

FIG. 4 shows a communication device 400.

The communication device 400 includes a message generator 401 configured to generate a message indicating that a mobile terminal is to determine a list of locations at which the mobile terminal has detected a need for a data communication with a mobile communication network and to transmit the determined list of locations to the mobile communication network.

The communication device further includes a transmitter 402 configured to transmit the message.

In other words, a communication device is for example provided that requests a mobile terminal (in other words a mobile communication terminal) to indicate one or more locations at which the mobile terminal wanted to perform a data communication (i.e. had a need for a data communication). For example, these include locations at which no data communication was carried out, e.g. a location at which the mobile terminal wanted to perform a data communication but a data communication has not been possible, e.g. due to a lack of coverage by the mobile communication network or since all radio resources of the mobile communication network had been used. This information allows the operator of the mobile communication network to enhance the mobile communication network, for example by deploying an additional base station (e.g. a macro base station or also a base station operating a femto cell) covering the location.

It should be noted that the mobile terminal may for example be requested to report all locations at which it has detected a need for data communication, e.g. all such locations that are determined within a certain (e.g. predetermined) period of time, e.g. after receipt of the message for a certain period or, for example, until further notice. The mobile communication network, e.g. the communication device, for example an EM or a TCE or another network component may then for example determine based on the network's knowledge whether a data communication has been actually carried out with the mobile terminal those locations where there was a need for data communication but no data communication took place, e.g. to identify lacks of (e.g. sufficient) coverage by the mobile communication network.

The locations may for example be determined by means of a (e.g. satellite) positioning system and may for example be given by means of geographical coordinates such as longitude and latitude (and altitude).

The list of locations may include one or more locations depending on the number of locations at which the mobile terminal has detected a need for data communication, and depending on the granularity of measurements configured by the communication device.

In context of the architecture described with reference to FIG. 3, the EM 301 is for example enabled to trigger Traffic Hot Spot Measurements (THSM) in the scope of MDT by letting the UE 305 record what service(s) and/or application(s) become active at what (geographical) location. In other words, the determination of locations at which a need for data communication is detected by the mobile terminal is in this case a MDT measurement which is in the following denoted as traffic hot spot (detection) measurement. Thus, places ("hot spots") may be found where data is generated and/or consumed as opposed to locations where traffic is conveyed over the air.

For example, the transmitter is configured to transmit the message to the mobile terminal (e.g. in case that the communication device is a base station), to a core network component or to a radio access network component.

Alternatively, the communication device is part of the network side of a wireless communication system and the transmitter is configured to transmit the message to another communication device of the network side of the wireless communication system. For example, the message is generated and transmitted by a TCE or an EM to another component of the network side such as a base station for forwarding to the mobile terminal.

The message for example indicates that the mobile terminal is to determine a list of locations at which the mobile terminal has detected a need for a data communication with the mobile communication network and at which a data communication with the mobile communication network has not been carried out and to transmit the determined list of locations to the mobile communication network.

The message may for example indicate that the mobile terminal is to determine a list of locations at which the mobile terminal has detected a need for a data communication with the mobile communication network and at which a data communication with the mobile communication network has not been possible and to transmit the determined list of locations to the mobile communication network.

The message may indicate that the mobile terminal is to determine a list of locations at which the mobile terminal has detected a need for a data communication with the mobile communication network and at which there is no coverage by the mobile communication network and to transmit the determined list of locations to the mobile communication network.

The message may indicate that the mobile terminal is to determine a list of locations at which the mobile terminal has detected a need for a data communication with the mobile communication network and at which a data communication with the mobile communication network is not possible due to overload situations on the air interface (for instance, lack of resources for random access or lack of resources in general) and to transmit the determined list of locations to the mobile communication network.

For example, the message indicates that the mobile terminal is to determine a list of locations at which the mobile terminal has detected a need for a data communication with the mobile communication network and at which a communication connection to the mobile communication has not been available for the mobile terminal and to transmit the determined list of locations to the mobile communication network.

The message may indicate that the mobile terminal is to further provide, for at least one of the determined locations, at least one of
 a type of an application running on the mobile terminal requiring the data communication at the at least one determined location;
 a class of a communication service (e.g., Quality of Service class) requiring for the data communication at the at least one determined location;
 a delay between the time of the detection of the need for (i.e. the requiring of) the data communication at the at least one determined location and the time of carrying out the data communication; and
 an indication of the volume of data that needs to be communicated in the data communication at the at least one determined location.

The message for example indicates that the mobile terminal is to determine a list of locations at which the mobile terminal has detected a need for a data communication with the mobile communication network and at which the delay between the time of the detection of the need for the data communication and the time of carrying out the data communication is above a predetermined delay threshold and to transmit the determined list of locations to the mobile communication network.

The predetermined delay threshold is for example specified in the message.

The message for example indicates that the mobile terminal is to determine a list of locations at which the mobile terminal has detected a need for a data communication with the mobile communication network and at which the volume of data that needs to be communicated in the data communication is above a predetermined volume threshold delay and to transmit the determined list of locations to the mobile communication network.

The predetermined volume threshold is for example specified in the message.

The data communication may be an uplink data communication, a downlink data communication or both. In general, data communication may be an exchange of data over the air interface between the mobile terminal and the mobile communication network (i.e., in uplink direction), between the mobile communication network and the mobile terminal (i.e., in downlink direction), or in both directions. Exchange of data may comprise exchange of c-plane (control plane) data as well as u-plane (user plane) data.

The data communication is for example the exchange of data over the air interface of a cellular mobile communication system.

The message may for example indicate that the mobile terminal is to log locations of the mobile terminal at which the mobile terminal detects a need for a data communication with the mobile communication network.

For example, the message indicates that the mobile terminal is to log locations of the mobile terminal at which the mobile terminal detects a need for a data communication with the mobile communication network and at which a data communication with the mobile communication network has not been carried out.

The communication device is for example part of the mobile communication network.

The communication device is for example a base station.

The message generator is for example configured to generate the message in accordance with MDT and the transmitter is for example configured to transmit the message in accordance with MDT.

The communication device may also be a part of the mobile communication network and the transmitter may be configured to transmit the message to another communication device of the mobile communication network.

Figure 5:
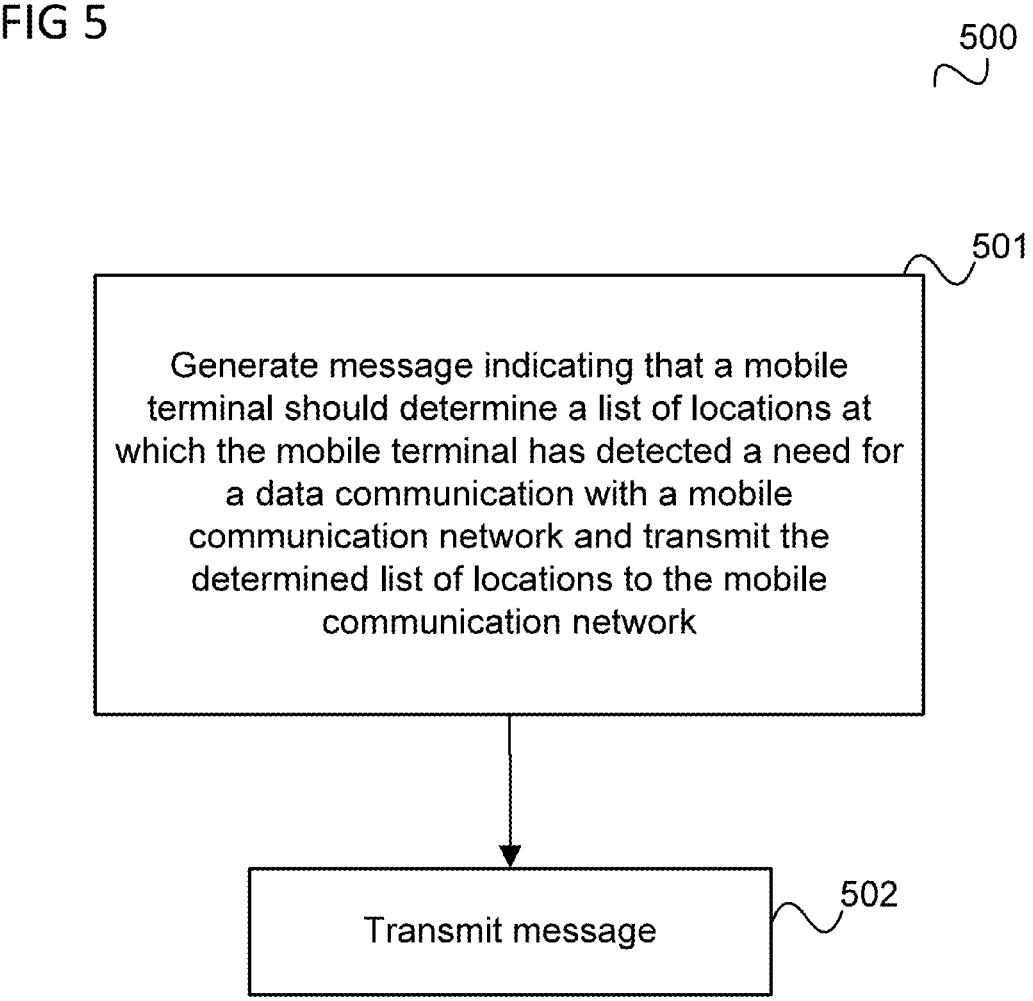
FIG. 5 shows a flow diagram illustrating a method for requesting information.

The communication device for example carries out a method as illustrated in FIG. 5.

FIG. 5 shows a flow diagram 500.

The flow diagram 500 illustrates a method for requesting information and is for example carried out by a communication device.

In 501, the communication device generates a message indicating that a mobile terminal is to determine a list of locations at which the mobile terminal has detected a need for a data communication with a mobile communication network and to transmit the determined list of locations to the mobile communication network.

In 502, the communication device transmits the message.

For example, the communication device transmits the message to the mobile terminal. However, the communication device may also transmit the message within the mobile communication network, e.g. to another communication device that forwards the message to the mobile terminal.

Figure 6:
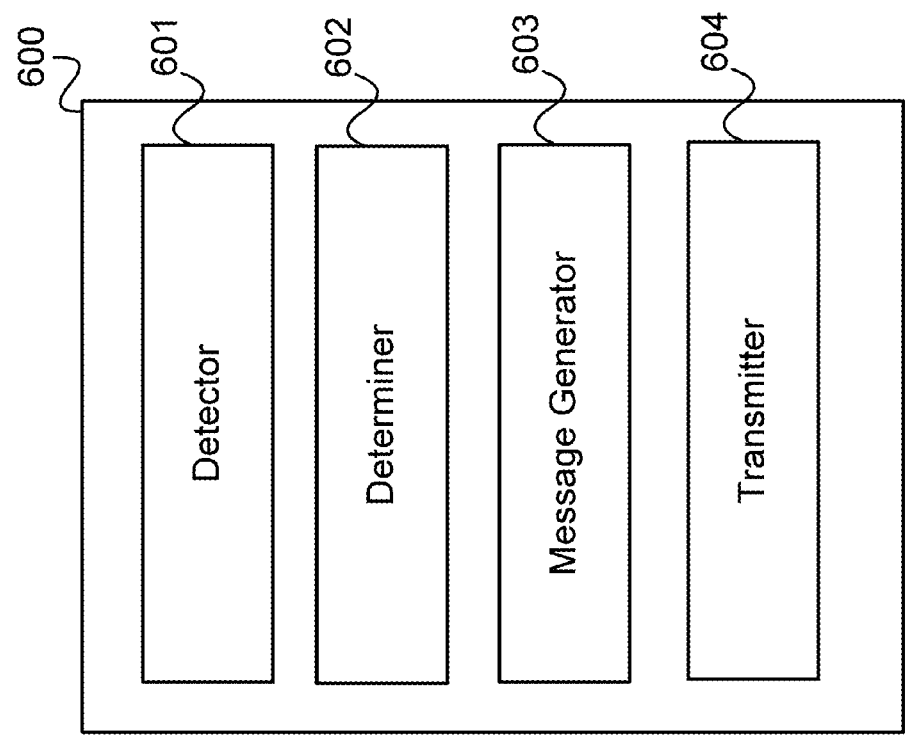
FIG. 6 shows a mobile terminal providing information.

The message is for example transmitted to the mobile terminal, e.g. to a mobile terminal as illustrated in FIG. 6.

FIG. 6 shows a mobile terminal 600.

The mobile terminal 601 includes a detector 601 configured to detect whether the mobile terminal has a need for a data communication with a mobile communication network.

The mobile terminal 601 further includes a determiner 602 configured to determine a list of locations at which the detector 601 has detected a need for data communication with the mobile communication network.

Further, the mobile terminal 601 includes a message generator 603 configured to generate a message including the determined list and a transmitter 604 configured to transmit the message.

The mobile terminal may for example report the determined locations to the network side, either in line of a pre-configuration of the mobile terminal to do this or in reaction to a message requesting the mobile terminal to do this (i.e. to log the one or more locations and report them), e.g. in reaction to the message generated and transmitted by the communication device 400.

For the latter, the mobile terminal may include a receiver configured to receive a message from a communication device indicating that the mobile terminal is to determine a list of locations at which the mobile terminal has detected a need for a data communication with a mobile communication network and to transmit the determined list of locations to the mobile communication network.

The transmitter is for example configured to transmit the data to the communication device.

Figure 7:
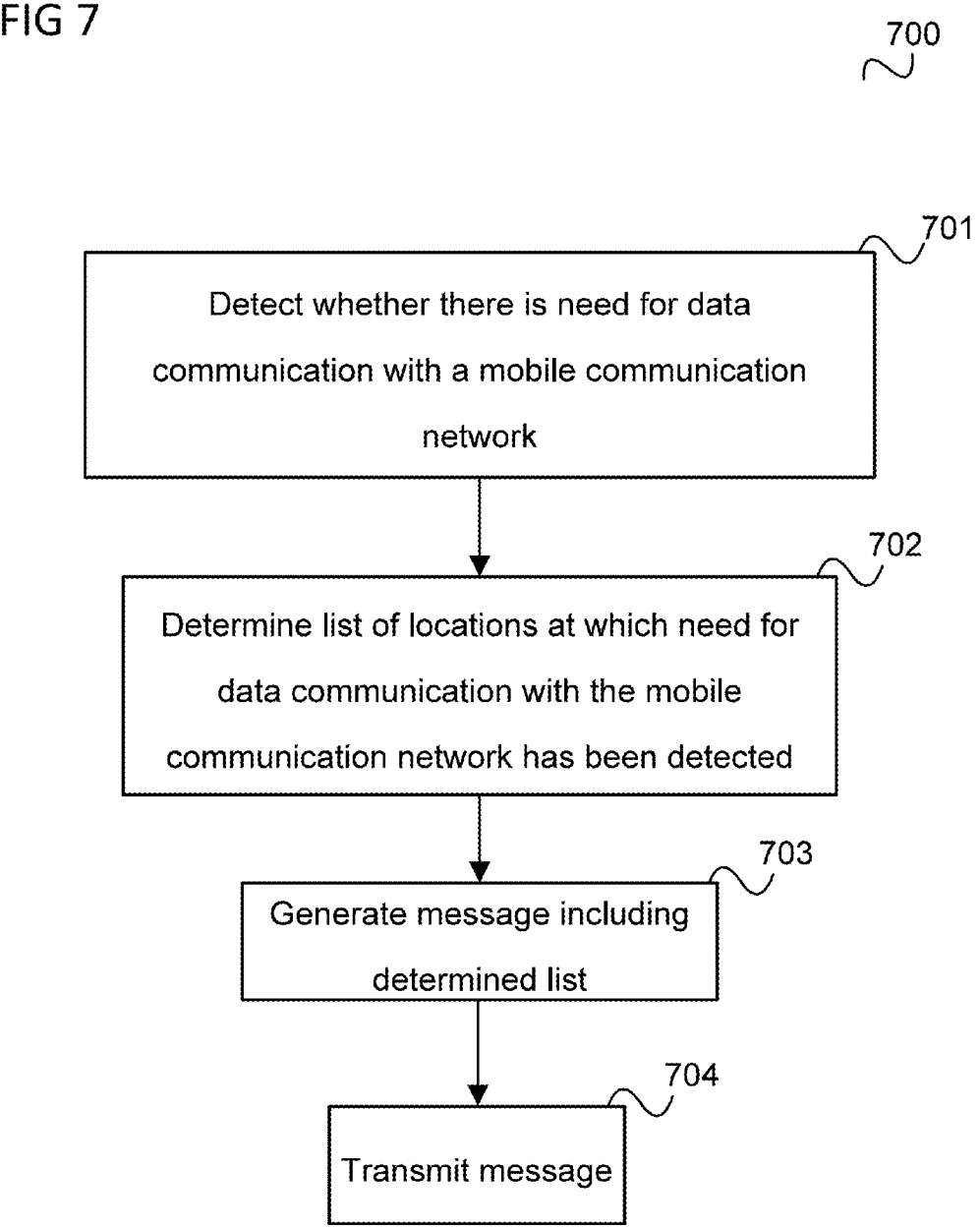
FIG. 7 shows a flow diagram illustrating a method for providing information.

The mobile terminal 700 for example carries out a method as illustrated in FIG. 7.

FIG. 7 shows a flow diagram 700.

The flow diagram 700 illustrates a method for providing information, for example carried out by a mobile terminal.

In 701, the mobile terminal detects whether it has a need for a data communication with a mobile communication network.

In 702, the mobile terminal determines a list of locations at which a need for data communication with the mobile communication network has been detected.

In 703, the mobile terminal generates a message including the determined list.

In 704, the mobile terminal transmits the message.

The method may further include receiving a message from a communication device indicating that the mobile terminal is to determine a list of locations at which the mobile terminal has detected a need for a data communication with a mobile communication network and to transmit the determined list of locations to the mobile communication network.

The method may for example include transmitting the message to the communication device.

The message is for example received from the communication device 400.

The components of the communication device and/or the mobile terminal (e.g. the message generator, the transmitter, the receiver, the detector, the determiner etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

It should be noted that aspects regarding implementation of components described in context with the communication device 400 and the method illustrated in FIG. 5 are analogously valid for the mobile terminal 600 and the method illustrated in FIG. 7 and vice versa. For example, the mobile terminal may send a list in line of request according to the message sent by the communication device according to the various examples. The mobile terminal may do this even in case that it is not configured to receive a corresponding request from the communication device. For example, the mobile terminal may be preconfigured to send a list as requested by the message according to the various examples without receiving such a message because it is preconfigured to do this.

In the following examples for the communication device 400, the mobile terminal 500 and the corresponding methods are described in more detail. In the following examples, the Trace-based MDT approach as described with reference to FIG. 3 is used. Configuration details (first from EM 301 to eNB 304, then from eNB 304 to UE 305), measurement details (in the UE 305), and reporting details (first from UE 305 to eNB 304, then from eNB 304 to the TCE 330) are discussed.

In this example, in the MDT configuration (first sent from EM 301 to eNB 304 and then from eNB 304 to UE 305) at least one parameter is added to turn on/off the "Traffic Hot Spot Detection" feature. In detail, this (set of) new parameter(s) may be used to indicate to the UE 305 that the TCE 330 (which can be seen as MDT Server) is interested in location details about places where traffic is actually generated (for submission in UL direction) by the UE 305, or places where there is a need by some application in the UE 305 to consume traffic (data retrieval in DL direction). Additionally, the TCE 330 may be interested in the type of service and/or the class of application that generates/requests data in those traffic hot spot areas and in the delay data experiences between generation and transmission (in UL direction) and between request and reception (in DL direction), respectively.

In the trace-based MDT report first sent from UE 305 to eNB 304 and then from eNB 304 to TCE 330 at least one parameter is added for the "Traffic Hot Spot Detection" results. This (set of) parameter(s) may be used to send detailed location stamps (for instance, based on the UE's inherent GNSS (Global Navigation Satellite System) capabilities) indicating places where traffic was actually generated (for submission in UL direction) by the UE 305, or where there was a need by some application of the UE 305 to consume traffic (request data retrieval in DL direction) to the TCE 330. Additionally, it may be used to convey information about the type of service and/or the class of application to the TCE 330. Further, the waiting time between the occurrence of a traffic hot spot detection event and the first opportunity to send/receive the data over the air interface is included in the trace-based MDT report.

Thus, a traffic hot spot detection use case can be supported. This means that the MNO (Mobile Network Operator) may obtain detailed knowledge about
- where UL traffic is generated in UEs;
- where a need for DL traffic consumption arises in UEs;
- what type(s) of service(s) or class(es) of application(s) cause these traffic characteristics;
- what locations would benefit from better coverage;
- the distance between locations where data was generated or requested versus places where data is actually conveyed over the air.
- the time (latency) it takes to set-up an RRC connection and to actually transmit data over the air after it has been generated or requested.

The MNO may choose to deploy macro/femto/pico cells in these locations taking the Traffic Hot Spot Measurements (THSM) results into account in order to improve his service offering. This may improve customer satisfaction.

In the following, examples for one or more parameters which are included into the MDT configuration as it is exchanged on the network side (i.e. in 307, 309 and 311 in FIG. 3) are described in more detail.

According to the following examples, in the trace-based MDT configuration at least one parameter is used to turn on/off the "Traffic Hot Spot Detection" feature, i.e. to have the UE transmit information about a location at which the UE has detected the need for a data communication.

In the following example, the trace session activation message sequence as described with reference to FIG. 3 is used for communicating this parameter to the UE 305. The at least one parameter is included (added) to the messages transmitted in 307, 309 and 311. Thus, the MDT configuration for traffic hot spot detection measurements is propagated from the EM (Element Manager) 301 to the base station 304 in 307, 309 and 311. For 311 (between MME 303 and base station 304) the S1AP (S1 Application Protocol) may be modified in order to convey the MDT Configuration including the at least one parameter controlling the traffic hot spot detection measurements.

In 307, 309 and 311, the MDT Configuration IE (information element) may be used to transmit the MDT configuration details from the EM 301 to the base station 304.

In the following three examples (alternatives) for possible modification of MDT Configuration IE are given to transmit one or more traffic hot spot detection parameters from the EM 301 to the base station 304. It should be noted that a combination of the three alternatives given in the following may be used.

Network-Side Traffic Hot Spot Detection Measurement Parameter Exchange Example #1

In this example, only one parameter is used to turn traffic hot spot detection measurements on and off. This example may for example be used for Immediate MDT.

In this example, a measurement denoted as M3 is defined for traffic hot spot detection measurements. This is in this example done in analogy to the other measurements such as M1 and M2 which are provided in MDT for LTE, e.g. as follows:

Measurements (for LTE for Immediate-MDT):
 M1: RSRP and RSRQ measurement by UE.
 M2: Power Headroom (PH) measurement by UE.
 M3: Traffic hot spot detection Measurements by UE For a UE in RRC_CONNECTED the M3 measurement can be used to turn on/off traffic hot spot detection measurements independently from (and in addition to) the other measurements M1 and M2 by setting a corresponding bit in the MDT configuration accordingly.

For example, the MDT configuration has the structure as shown in table 1 wherein Bit X=Mx in the 13$^{th}$ line of table 1 has been added to activate or deactivate the traffic hot spot detection measurements. This bit is for example defined in the communication standard.

TABLE 1

| | The IE defines the MDT configuration parameters. | | | | |
|---|---|---|---|---|---|
| 1 | IE/Group Name | Presence | Range | IE type and reference | Semantics description |
| 2 | MDT Activation | M | | ENUMERATED (Immediate MDT only, Logged MDT only, Immediate MDT and Trace, . . .) | |

TABLE 1-continued

The IE defines the MDT configuration parameters.

| | IE/Group Name | Presence | Range | IE type and reference | Semantics description |
|---|---|---|---|---|---|
| 3 | CHOICE Area Scope of MDT | M | | | |
| 4 | >Cell based | | | | |
| 5 | >>Cell ID List for MDT | | 1 to <maxnoof CellIDfor MDT> | | |
| 6 | >>>E-CGI | M | | 9.2.1.38 | |
| 7 | >TA based | | | | |
| 8 | >>TA List for MDT | | 1 to <maxnoof TAforMDT> | | |
| 9 | >>>TAC | M | | 9.2.3.7 | |
| 10 | >PLMN Wide | | | NULL | |
| 11 | CHOICE MDT Mode | M | | | |
| 12 | >Immediate MDT | | | | |
| 13 | >>Measurements to Activate | M | | BITSTRING (SIZE(8)) | Each position in the bitmap indicates a MDT measurement as defined according to 3GPP. First Bit = M1, Second Bit = M2. Third Bit = M3 Other bits are reserved for future use and are ignored if received. Value "1" indicates "activate" and value "0" indicates "do not activate". |
| 14 | >>Reporting Trigger MDT | M | | ENUMERATED (periodic, A2event-triggered, , . . .) | |
| 15 | >>Threshold Event A2 | C-ifM1A2-trigger | | | Included in case of event-triggered reporting for measurement M1 |
| 16 | >>>CHOICE Threshold | M | | | |
| 17 | >>>>RSRP | | | | |
| 18 | >>>>>Threshold RSRP | M | | INTEGER (0 . . . 97) | As defined according to 3GPP. |
| 19 | >>>>RSRQ | | | | |
| 20 | >>>>>Threshold RSRQ | M | | INTEGER (0 . . . 34) | As defined according to 3GPP. |
| 21 | >>Periodic reporting MDT | C-ifperiodic-MDT | | | Included in case of periodic reporting. |
| 22 | >>>Report interval | M | | ENUMERATED (ms 120, ms 240, ms 480, ms 640, ms 1024, ms 2048, ms 5120, ms 10240, , min 1, min 6, min 12, min 30, min 60) | As defined according to 3GPP. |
| 23 | >>>Report amount | M | | ENUMERATED (1, 2, 4, 8, 16, 32, 64, infinity) | Number of reports. |
| 24 | >Logged MDT | | | | |
| 25 | >>Logging interval | M | | ENUMERATED (1.28, 2.56, 5.12, 10.24, 20.48, 30.72, 40.96 and 61.44) | As defined according to 3GPP. Unit: [second] |
| 26 | >>Logging duration | M | | ENUMERATED (10, 20, 40, 60, 90 and 120) | As defined according to 3GPP. Unit: [minute] |

Network-Side Traffic Hot Spot Detection Measurement Parameter Exchange Example #2

This example may for example be used for Logged MDT. In this example an information element is defined for traffic hot spot detection measurements that may be optional and can be used to turn on/off the traffic hot spot detection measurements performed by the UE 305 in RRC_IDLE mode.

For example, the MDT configuration has the structure as shown in table 2 wherein the information element THSM in the last line has been added to activate or deactivate the traffic hot spot detection measurements.

TABLE 2

The IE defines the MDT configuration parameters.

| IE/Group Name | Presence | Range | IE type and reference | Semantics description |
|---|---|---|---|---|
| MDT Activation | M | | ENUMERATED (Immediate MDT only, Logged MDT only, Immediate MDT and Trace, . . .) | |
| CHOICE Area Scope of MDT >Cell based | M | | | |
| >>Cell ID List for MDT | | 1 to <maxno ofCellID forMDT> | | |
| >>>E-CGI >TA based | M | | 9.2.1.38 | |
| >>TA List for MDT | | 1 to <maxno ofTAfor MDT> | | |
| >>>TAC >PLMN Wide | M | | 9.2.3.7 NULL | |
| CHOICE MDT Mode >Immediate MDT | M | | | |
| >>Measurements to Activate | M | | BITSTRING (SIZE(8)) | Each position in the bitmap indicates a MDT measurement as defined according to 3GPP. First Bit = M1, Second Bit = M2. Other bits are reserved for future use and are ignored if received. Value "1" indicates "activate" and value "0" indicates "do not activate". |
| >>Reporting Trigger MDT | M | | ENUMERATED (periodic, A2event-triggered, , . . .) | |
| >>Threshold Event A2 | C-ifM1A2-trigger | | | Included in case of event-triggered reporting for measurement M1 |
| >>>CHOICE Threshold >>>>RSRP | M | | | |
| >>>>>Threshold RSRP >>>>RSRQ | M | | INTEGER (0 . . . 97) | As defined according to 3GPP. |
| >>>>>Threshold RSRQ | M | | INTEGER (0 . . . 34) | As defined according to 3GPP. |
| >>Periodic reporting MDT | C-ifperiodic-MDT | | | Included in case of periodic reporting. |
| >>>Report interval | M | | ENUMERATED (ms 120, ms 240, ms 480, ms 640, ms 1024, ms 2048, ms 5120, ms 10240, , min 1, min 6, min 12, min 30, min 60) | As defined according to 3GPP. |

TABLE 2-continued

| The IE defines the MDT configuration parameters. IE/Group Name | Presence | Range | IE type and reference | Semantics description |
|---|---|---|---|---|
| >>>Report amount | M | | ENUMERATED (1, 2, 4, 8, 16, 32, 64, infinity) | Number of reports. |
| >Logged MDT | | | | |
| >>Logging interval | M | | ENUMERATED (1.28, 2.56, 5.12, 10.24, 20.48, 30.72, 40.96 and 61.44) | As defined according to 3GPP. Unit: [second] |
| >>Logging duration | M | | ENUMERATED (10, 20, 40, 60, 90 and 120) | As defined according to 3GPP. Unit: [minute] |
| >>THSM | O | | Boolean (true, false) | Used to turn "Traffic Hot Spot Detection" measurements on and off. Value "1" indicates "activate" and value "0" indicates "do not activate". |

In the above two examples, details of the traffic hot spot detection measurements may be pre-defined, e.g. what information the UE determines, which thresholds the UE applies, what reporting triggers are used etc.

Network-Side Traffic Hot Spot Detection Measurement Parameter Exchange Example #3

In this example, as traffic hot spot detection measurements may be relevant for UEs in both modes of operation, namely in RRC_IDLE and in RRC_CONNECTED, a generic IE for use in the MDT Configuration IE is defined which may be used for both Immediate-MDT and Logged-MDT.

In this example, a number of parameters for a traffic hot spot detection measurement are given in the MDT configuration to allow more flexibility.

For example, the MDT configuration has the structure as shown in table 3 wherein the information elements in the last 15 lines have been added for traffic hot spot detection measurement parameters.

TABLE 3

| | The IE defines the MDT configuration parameters. IE/Group Name | Presence | Range | IE type and reference | Semantics description |
|---|---|---|---|---|---|
| 1 | | | | | |
| 2 | MDT Activation | M | | ENUMERATED (Immediate MDT only, Logged MDT only, Immediate MDT and Trace, . . .) | |
| 3 | CHOICE Area Scope of MDT | M | | | |
| 4 | >Cell based | | | | |
| 5 | >>Cell ID List for MDT | | 1 to <maxnoof CellIDfor MDT> | | |
| 6 | >>>E-CGI | M | | 9.2.1.38 | |
| 7 | >TA based | | | | |
| 8 | >>TA List for MDT | | 1 to <maxnoof TAforMDT> | | |
| 9 | >>>TAC | M | | 9.2.3.7 | |
| 10 | >PLMN Wide | | | NULL | |
| 11 | CHOICE MDT Mode | M | | | |
| 12 | >Immediate MDT | | | | |
| 13 | >>Measurements to Activate | M | | BITSTRING (SIZE(8)) | Each position in the bitmap indicates a MDT measurement. First Bit = M1, Second Bit = M2. Other bits are reserved for future use and are ignored if received. Value "1" indicates "activate" and value "0" indicates "do not activate". |

TABLE 3-continued

| 1 | The IE defines the MDT configuration parameters. IE/Group Name | Presence | Range | IE type and reference | Semantics description |
|---|---|---|---|---|---|
| 14 | >>Reporting Trigger MDT | M | | ENUMERATED (periodic, A2event-triggered, , . . .) | |
| 15 | >>Threshold Event A2 | C-ifM1A2-trigger | | | Included in case of event-triggered reporting for measurement M1 |
| 16 | >>>CHOICE Threshold | M | | | |
| 17 | >>>>RSRP | | | | |
| 18 | >>>>>Threshold RSRP | M | | INTEGER (0 . . . 97) | As defined according to 3GPP. |
| 19 | >>>>RSRQ | | | | |
| 20 | >>>>>Threshold RSRQ | M | | INTEGER (0 . . . 34) | As defined according to 3GPP. |
| 21 | >>Periodic reporting MDT | C-ifperiodic-MDT | | | Included in case of periodic reporting. |
| 22 | >>>Report interval | M | | ENUMERATED (ms 120, ms 240, ms 480, ms 640, ms 1024, ms 2048, ms 5120, ms 10240, , min 1, min 6, min 12, min 30, min 60) | As defined according to 3GPP. |
| 23 | >>>Report amount | M | | ENUMERATED (1, 2, 4, 8, 16, 32, 64, infinity) | Number of reports. |
| 24 | | | | | |
| 25 | >Logged MDT | | | | |
| 26 | >>Logging interval | M | | ENUMERATED (1.28, 2.56, 5.12, 10.24, 20.48, 30.72, 40.96 and 61.44) | As defined according to 3GPP. Unit: [second] |
| 27 | >>Logging duration | M | | ENUMERATED (10, 20, 40, 60, 90 and 120) | As defined according to 3GPP. Unit: [minute] |
| 28 | THSM | O | | Boolean (true, false) | Used to turn "Traffic Hot Spot Detection" measurements on and off. Value "1" indicates "activate" and value "0" indicates "do not activate". |
| 29 | >UL | O | | | Container for uplink specific configuration parameters. |
| 30 | >>Type of Application(s) | O | | Boolean (true, false) | Used to collect information about the type of application(s) that generate data. Value "1" indicates "activate" and value "0" indicates "do not activate". |
| 31 | >>Associated Service Class(es) | O | | Boolean (true, false) | Used to collect information about the service class(es) of the generate data. Value "1" indicates "activate" and value "0" indicates "do not activate". |
| 32 | >>Data Volume | O | | Boolean (true, false) | Used to turn on/off measurements of the generated data volume supposed to be transmitted in UL direction. Value "1" indicates "activate" and value "0" indicates "do not activate". |
| 33 | >>Volume Threshold | O | | ENUMERATED (50, 100, 200, 500, 1000, 2000, 5000, etc.) | Used to suppress reporting of UL Data Volume if the measured data volume is insignificant. For example, value "200" means "don't report UL data volume if it is below 200 kBytes". |

TABLE 3-continued

| 1 | The IE defines the MDT configuration parameters. IE/Group Name | Presence | Range | IE type and reference | Semantics description |
|---|---|---|---|---|---|
| 34 | >>Delay until first transmission | O | | Boolean (true, false) | Used to turn on/off measurements of the reception delay in the UE. Value "1" indicates "activate" and value "0" indicates "do not activate. |
| 35 | >>Delay Threshold | O | | ENUMERATED (500, 1000, 2000, 5000, etc.) | Used to suppress the generation of a THSM report if delay is insignificant. For example, value "1000" means "refrain from reporting if delay is less than 1000 msec". |
| 36 | >DL | O | | | Container for downlink specific configuration parameters. |
| 37 | >>Type of Application(s) | O | | Boolean (true, false) | Used to collect information about the type of application(s) that generate data. Value "1" indicates "activate" and value "0" indicates "do not activate". |
| 38 | >>Associated Service Class(es) | O | | Boolean (true, false) | Used to collect information about the service class(es) of the generate data. Value "1" indicates "activate" and value "0" indicates "do not activate". |
| 39 | >>Data Volume | O | | Boolean (true, false) | Used to turn on/off estimates of data volume to be retrieved in DL direction. Value "1" indicates "activate" and value "0" indicates "do not activate". |
| 40 | >>Volume Threshold | O | | ENUMERATED (50, 100, 200, 500, 1000, 2000, 5000, etc.) | Used to suppress reporting of DL Data Volume if the estimated data volume is insignificant. For example, value "200" means "don't report estimated DL data volume if it is below 200 kBytes." |
| 41 | >>Delay until first reception | O | | Boolean (true, false) | Used to turn on/off measurements of the transmission delay in the UE. Value "1" indicates "activate" and value "0" indicates "do not activate". |
| 42 | >>Delay Threshold | O | | ENUMERATED (500, 1000, 2000, 5000, etc.) | Used to suppress the generation of a THSM report if delay is insignificant. For example, value "1000" means "refrain from reporting if delay is less than 1000 msec". |

In the following, examples for using RRC signaling over the air interface to convey the traffic hot spot detection measurement configuration from the base station 304 to the mobile terminal 305 are described. In the following examples, a RRC Connection Reconfiguration is used to configure and reconfigure traffic hot spot detection measurements in Immediate-MDT for a UE in RRC_CONNECTED and a Logged Measurement Configuration message is used to configure traffic hot spot detection measurements in Logged-MDT for a UE in RRC_IDLE.

A RRC Connection Reconfiguration message is typically used to modify an RRC connection, e.g. to establish/modify/release radio bearers, to perform handover, or to setup/modify/release measurements. As part of the procedure, NAS (Non-Access Stratum) dedicated information may be transferred from the E-UTRAN 101 to the UE 105. In the following, a possible modification of the RRC Connection Reconfiguration message is described for conveying traffic hot spot detection measurement configuration information, in this example using the measConfig IE of the RRC Connection Reconfiguration which specifies the measurements to be performed by the UE and covers intra-frequency, inter-frequency and inter-RAT mobility as well as configuration of measurement gaps.

A RRC Connection Reconfiguration message as described in the following is for example transmitted in 315, wherein it is assumed for this example that the UE 305 is in RRC_CONNECTED during 315, 316, 317, 318, and 319.

The RRC Connection Reconfiguration message according to this example for example has a structure as shown in table 4 wherein the measConfig IE has been added as shown in the 17$^{th}$ line of table 4. It is transmitted by SRB1 (SRB: Signaling Radio Bearer) via the logical channel DCCH with the AM RLC-SAP (Radio Link Control-Service Access7 Point).

TABLE 4

| | |
|---|---|
| 1 | -- ASN1START |
| 2 | |
| 3 | RRCConnectionReconfiguration ::= SEQUENCE { |
| 4 |   rrc-TransactionIdentifier                RRC-TransactionIdentifier, |
| 5 |   criticalExtensions                      CHOICE { |
| 6 |     c1                                     CHOICE{ |
| 7 |       rrcConnectionReconfiguration-r8        RRCConnectionReconfiguration-r8-IEs, |
| 8 |       spare7 NULL, |
| 9 |       spare6 NULL, spare5 NULL, spare4 NULL, |
| 10 |       spare3 NULL, spare2 NULL, spare1 NULL |
| 11 |     }, |
| 12 |     criticalExtensionsFuture            SEQUENCE { } |
| 13 |   } |
| 14 | } |
| 15 | |
| 16 | RRCConnectionReconfiguration-r8-IEs ::= SEQUENCE { |
| 17 |   measConfig                       MeasConfig OPTIONAL, -- Need ON |
| 18 |   mobilityControlInfo             MobilityControlInfo OPTIONAL, -- Cond HO |
| 19 |   dedicatedInfoNASList           SEQUENCE (SIZE(1..maxDRB)) OF |
| 20 |                                           DedicatedInfoNAS OPTIONAL, -- Cond nonHO |
| 21 |   radioResourceConfigDedicated      RadioResourceConfigDedicated OPTIONAL, -- Cond HO-toEUTRA |
| 22 |   securityConfigHO                SecurityConfigHO OPTIONAL, -- Cond HO |
| 23 |   nonCriticalExtension             RRCConnectionReconfiguration-v890-IEs OPTIONAL |
| 24 | } |
| 25 | |
| 26 | RRCConnectionReconfiguration-v890-IEs ::= SEQUENCE { |
| 27 |   lateNonCriticalExtension         OCTET STRING OPTIONAL, -- Need OP |
| 28 |   nonCriticalExtension             RRCConnectionReconfiguration-v920-IEs    OPTIONAL |
| 29 | } |
| 30 | |
| 31 | RRCConnectionReconfiguration-v920-IEs ::= SEQUENCE { |
| 32 |   otherConfig-r9                  OtherConfig-r9 OPTIONAL, -- Need ON |
| 33 |   fullConfig-r9                    ENUMERATED {true} OPTIONAL, -- Cond HO-Reestab |
| 34 |   nonCriticalExtension             RRCConnectionReconfiguration-v1020-IEs    OPTIONAL |
| 35 | } |
| 36 | |
| 37 | RRCConnectionReconfiguration-v1020-IEs ::= SEQUENCE { |
| 38 |   sCellToReleaseList-r10           SCellToReleaseList-r10 OPTIONAL, -- Need ON |
| 39 |   sCellToAddModList-r10          SCellToAddModList-r10 OPTIONAL, -- Need ON |
| 40 |   nonCriticalExtension             SEQUENCE { } OPTIONAL -- Need OP |
| 41 | } |
| 42 | |
| 43 | SCellToAddModList-r10 ::=           SEQUENCE (SIZE (1..maxSCell-r10)) OF SCellToAddMod-r10 |
| 44 | |
| 45 | SCellToAddMod-r10 ::=               SEQUENCE { |
| 46 |   sCellIndex-r10                  SCellIndex-r10, |
| 47 |   cellIdentification-r10            SEQUENCE { |
| 48 |     physCellId-r10               PhysCellId, |
| 49 |     dl-CarrierFreq-r10           ARFCN-ValueEUTRA |
| 50 |   }                                                 OPTIONAL, |
| 51 |   radioResourceConfigCommonSCell-r10      RadioResourceConfigCommonSCell-r10     OPTIONAL, -- Cond SCellAdd |
| 52 |   radioResourceConfigDedicatedSCell-r10    RadioResourceConfigDedicatedSCell-r10     OPTIONAL, |
| 53 |   ... |

TABLE 4-continued

| | | |
|---|---|---|
| 54 | } | |
| 55 | | |
| 56 | SCellToReleaseList-r10 ::= | SEQUENCE (SIZE (1..maxSCell-r10)) OF SCellIndex-r10 |
| 57 | | |
| 58 | SecurityConfigHO ::= | SEQUENCE { |
| 59 |   handoverType | CHOICE { |
| 60 |     intraLTE | SEQUENCE { |
| 61 |       securityAlgorithmConfig | SecurityAlgorithmConfig |
| 62 |       keyChangeIndicator | BOOLEAN, |
| 63 |       nextHopChainingCount | NextHopChainingCount |
| 64 |     }, | |
| 65 |     interRAT | SEQUENCE { |
| 66 |       securityAlgorithmConfig | SecurityAlgorithmConfig, |
| 67 |       nas-SecurityParamToEUTRA | OCTET STRING (SIZE(6)) |
| 68 |     } | |
| 69 |   }, | |
| 70 |   ... | |
| 71 | } | |
| 72 | | |
| 73 | | |
| 74 | -- ASN1STOP | |

The IE measConfig for example has the structure as illustrated in table 5 wherein the entries in lines 10 to 14 and 33 to 49 have been added for traffic hot spot detection measurement parameters.

TABLE 5

| | | |
|---|---|---|
| 1 | -- ASN1START | |
| 2 | | |
| 3 | MeasConfig ::= | SEQUENCE { |
| 4 |   -- Measurement objects | |
| 5 |   measObjectToRemoveList | MeasObjectToRemoveList OPTIONAL    measObjectToAddModList MeasObjectToAddModList    OPTIONAL |
| 6 |   -- Reporting configurations | |
| 7 |   reportConfigToRemoveList | ReportConfigToRemoveList OPTIONAL    reportConfigToAddModList ReportConfigToAddModList    OPTIONAL |
| 8 |   -- Measurement identities | |
| 9 |   measIdToRemoveList | MeasIdToRemoveList OPTIONAL    measIdToAddModList    MeasIdToAddModList |
| 10 |   -- Traffic Hot Spot Detection configuration parameters | |
| 11 |   THSM ::= | SEQUENCE { |
| 12 |     THSM-UL-Container | |
| 13 |     THSM-DL-Container | |
| 14 |   } | |
| 15 |   -- Other parameters | |
| 16 |   quantityConfig | QuantityConfig OPTIONAL    measGapConfig    MeasGapConfig |
| 17 |   s-Measure | RSRP-Range OPTIONAL    preRegistrationInfoHRPD PreRegistrationInfoHRPD    OPTIONAL    speedStatePars CHOICE { |
| 18 |     release | NULL, |
| 19 |     setup | SEQUENCE { |
| 20 |       mobilityStateParameters | MobilityStateParameters, |
| 21 |       timeToTrigger-SF | SpeedStateScaleFactors |
| 22 |     } | |
| 23 |   } OPTIONAL | |
| 24 |   ... | |
| 25 | } | |
| 26 | | |
| 27 | MeasIdToRemoveList ::= | SEQUENCE (SIZE (1..maxMeasId)) OF MeasId |
| 28 | | |
| 29 | MeasObjectToRemoveList ::= | SEQUENCE (SIZE (1..maxObjectId)) OF MeasObjectId |
| 30 | | |
| 31 | ReportConfigToRemoveList ::= | SEQUENCE (SIZE (1..maxReportConfigId)) OF ReportConfigId |
| 32 | | |
| 33 | THSM-UL-Container ::= | SEQUENCE { |
| 34 |   MaxULHotSpots | INTEGER (0..30) |

TABLE 5-continued

| | | |
|---|---|---|
| 35 | TypeOfApplications | BOOLEAN |
| 36 | ServiceClasses | BOOLEAN |
| 37 | DataVolume | BOOLEAN |
| 38 | DataThreshold | ENUMERATED {kB50, kB100, kB200, kB500...} |
| 39 | Delay | BOOLEAN |
| 40 | DelayThreshold | ENUMERATED {ms500, ms1000, ms2000, ms5000, ...} |
| 41 | | |
| 42 | THSM-DL-Container ::= | SEQUENCE { |
| 43 | MaxDLHotSpots | INTEGER (0..30) |
| 44 | TypeOfApplications | BOOLEAN |
| 45 | ServiceClasses | BOOLEAN |
| 46 | DataVolume | BOOLEAN |
| 47 | DataThreshold | ENUMERATED {kB50, kB100, kB200, kB500...} |
| 48 | Delay | BOOLEAN |
| 49 | DelayThreshold | ENUMERATED {ms500, ms1000, ms2000, ms5000, ...} |
| 50 | | |
| 51 | | |
| 52 | -- ASN1STOP | |

For traffic hot spot detection measurement with Logged-MDT, i.e. in case that 317 (if performed at all) and 318 are performed when the UE 305 is in idle mode, a LoggedMeasurementConfiguration RRC message is for example used in 315 for transmitting the MDT configuration including the THSM (traffic hot spot detection measurement) parameters to the UE 305. It should be noted that the acknowledgement in 316 may be omitted in this case.

The Logged Measurement Configuration RRC message is typically used by E-UTRAN 101 to configure the UE 105 to perform logging of measurement results while it is in RRC_IDLE. For transferring the logged MDT traffic hot spot detection measurement configuration, the Logged Measurement Configuration RRC message for example has the structure as shown in table 6, wherein the entries in lines 23 to 48 have been added for traffic hot spot detection measurement parameters. It is transmitted by SRB1 (SRB: Signaling Radio Bearer) via the logical channel DCCH with the AM RLC-SAP (Radio Link Control-Service Access Point).

TABLE 6

| | | |
|---|---|---|
| 1 | -- ASN1START | |
| 2 | | |
| 3 | LoggedMeasurementConfiguration-r10 ::= SEQUENCE { | |
| 4 | criticalExtensions | CHOICE { |
| 5 | c1 | CHOICE { |
| 6 | loggedMeasurementConfiguration-r10 LoggedMeasurementConfiguration-r10-IEs, | |
| 7 | spare3 NULL, spare2 NULL, spare1 NULL | |
| 8 | }, | |
| 9 | criticalExtensionsFuture | SEQUENCE { } |
| 10 | } | |
| 11 | } | |
| 12 | | |
| 13 | | |
| 14 | LoggedMeasurementConfiguration-r10-IEs ::= SEQUENCE { | |
| 15 | traceReference-r10 | TraceReference-r10, |
| 16 | traceRecordingSessionRef-r10 | OCTET STRING (SIZE (2)), |
| 17 | tce-Id-r10 | OCTET STRING (SIZE (1)), |
| 18 | absoluteTimeInfo-r10 | AbsoluteTimeInfo-r10, |
| 19 | areaConfiguration-r10 | AreaConfiguration-r10 OPTIONAL, -- Need OR |
| 20 | loggingDuration-r10 | LoggingDuration-r10, |
| 21 | loggingInterval-r10 | LoggingInterval-r10, |
| 22 | nonCriticalExtension | SEQUENCE { } OPTIONAL -- Need OP |
| 23 | -- Traffic Hot Spot Detection configuration parameters | |
| 24 | THSM ::= | SEQUENCE { |
| 25 | THSM-UL-Container | |

TABLE 6-continued

| | | |
|---|---|---|
| 26 | THSM-DL-Container | |
| 27 | } | |
| 28 | | |
| 29 | } | |
| 30 | | |
| 31 | THSM-UL-Container ::= | SEQUENCE { |
| 32 | MaxULHotSpots | INTEGER (0..30) |
| 33 | TypeOfApplications | BOOLEAN |
| 34 | ServiceClasses | BOOLEAN |
| 35 | DataVolume | BOOLEAN |
| 36 | DataThreshold | ENUMERATED {kB50, kB100, kB200, kB500, ...} |
| 37 | Delay | BOOLEAN |
| 38 | DelayThreshold | ENUMERATED {ms500, ms1000, ms2000, ms5000, ...} |
| 39 | | |
| 40 | | |
| 41 | THSM-DL-Container ::= | SEQUENCE { |
| 42 | MaxDLHotSpots | INTEGER (0..30) |
| 43 | TypeOfApplications | BOOLEAN |
| 44 | ServiceClasses | BOOLEAN |
| 45 | DataVolume | BOOLEAN |
| 46 | DataThreshold | ENUMERATED {kB50, kB100, kB200, kB500...} |
| 47 | Delay | BOOLEAN |
| 48 | DelayThreshold | ENUMERATED {ms500, ms1000, ms2000, ms5000, ...} |
| 49 | | |
| 50 | | |
| 51 | -- ASN1STOP | |

Figure 8:
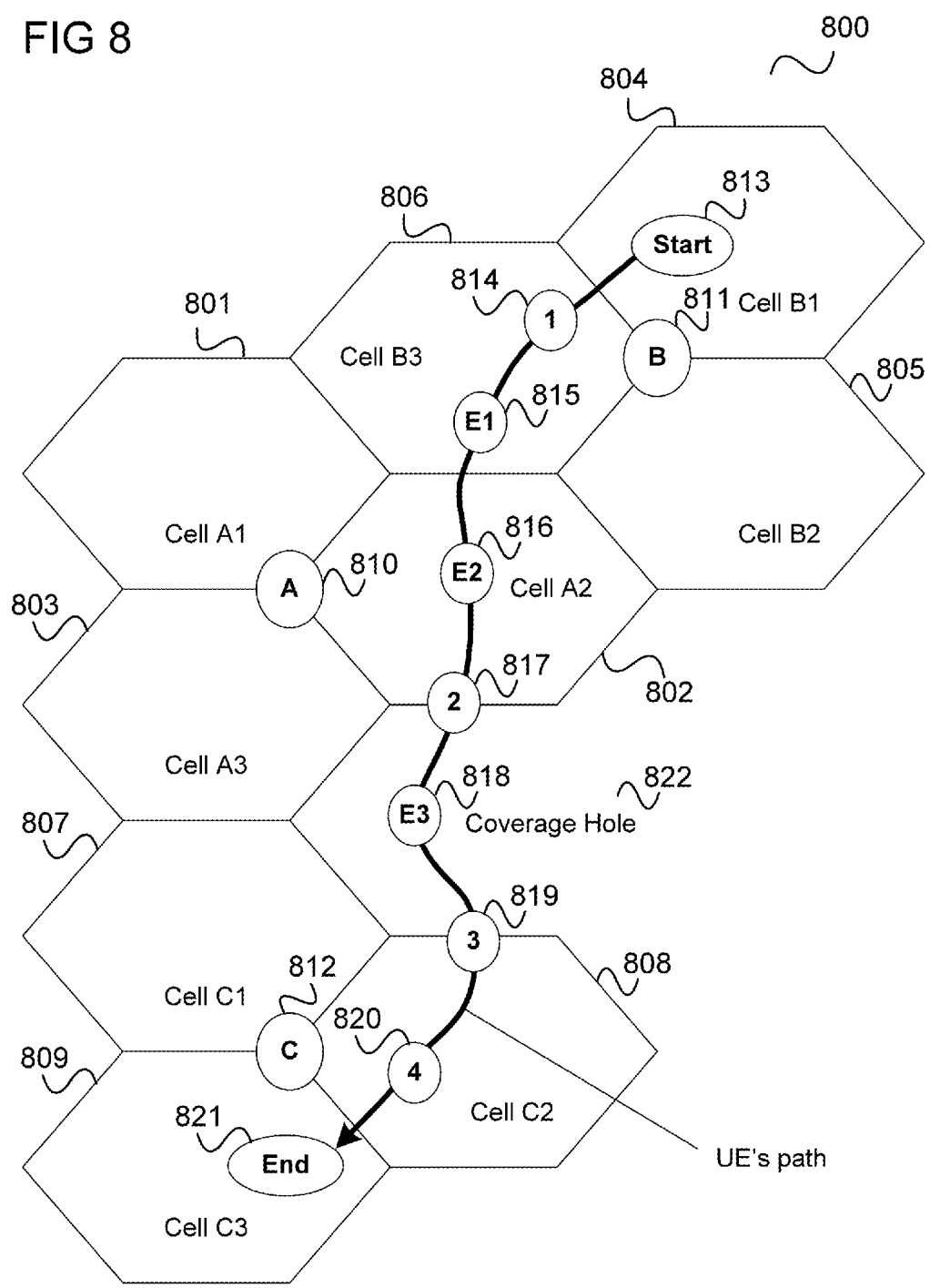
FIG. 8 shows a radio cell arrangement.

An example for a wireless network topology of a PLMN (Public Land Mobile Network) with three base stations A, B and C, each of which spans three (more or less) hexagonal radio cells and a mobile terminal performing traffic hot spot detection measurements in such a scenario is given in FIG. 8.

FIG. 8 shows a radio cell arrangement 800.

The radio cell arrangement 800 includes a first (radio) cell 801 (denoted as cell A1), a second cell 802 (denoted as cell A2) and a third cell 803 (denoted as cell A3) which are operated by a first base station 810 (denoted as base station A).

The radio cell arrangement 800 further includes a fourth cell 804 (denoted as cell B1), a fifth cell 805 (denoted as cell B2) and a sixth cell 806 (denoted as cell B3) which are operated by a second base station 811 (denoted as base station B).

The radio cell arrangement 800 further includes a seventh cell 807 (denoted as cell C1), an eighth cell 808 (denoted as cell C2) and a ninth cell 809 (denoted as cell C3) which are operated by a third base station 812 (denoted as base station C).

The base stations 810, 811, and 812 for example correspond to the base stations 103 and the radio cells 801 to 809 for example correspond to the radio cells 104.

A mobile terminal is assumed to move from a starting point 813, via a first waypoint 814, a second waypoint 815, a third waypoint 816, a fourth waypoint 817, a fifth waypoint 818, a sixth waypoint 819 and a seventh waypoint 820 to an endpoint 821.

In this example, it is assumed that the network planning was not so good and there is a coverage hole 822 between the second radio cell 802 and the eighth radio cell 808 along the mobile terminal's path.

The mobile terminal starts its journey through the PLMN at the starting point 813. It is assumed that at the first waypoint 814 (the sixth radio cell 806) it is configured to perform traffic hot spot detection measurements by the network side, e.g. according to 315 of FIG. 3. This may happen in addition to or instead of other "legacy" MDT measurement configurations.

It is further assumed that the second waypoint 815, the third waypoint 816 and the fifth waypoint 818 (indicated as events E1 through E3) are locations where a need for exchange of data arises at the mobile terminal, i.e. some application or service in the mobile terminal either generates data or generates a request to retrieve data from some network source or server. These events are detected by the mobile terminal. Whenever such an event occurs the mobile terminal creates a dedicated event log. It for example at least includes a detailed location stamp and may further include some other auxiliary pieces of information. It is assumed that at the second waypoint 815 and the third waypoint 816, the mobile terminal can go into RRC_CONNECTED right away to transmit or receive data. So, data generation in the mobile terminal falls together with UL data transmissions and requests for data retrieval fall together with DL data transmissions, respectively. However, in this example, at the fifth waypoint 818 (event E3) this is not possible due to coverage problems.

At the fourth waypoint 817, the mobile terminal moves out of coverage of the mobile communication system. At such a location, a mobile terminal that is in RRC_CONNECTED typically experiences a RLF (Radio Link Failure) and initiates a state transition to RRC_IDLE if it cannot return to the old serving cell (in this case the second radio cell 802), while a mobile terminal that is in RRC_IDLE already typically starts searching for a new radio cell to camp upon.

At the sixth waypoint 819, the mobile terminal enters network coverage again (in this case the eighth radio cell 808). This means that the mobile terminal can camp on the eighth radio cell 808 in case the mobile terminal is in RRC_IDLE or switch to RRC_CONNECTED mode of operation and use the eighth radio cell 808 for the exchange of data with the base station (i.e. the third base station 812).

The earliest opportunity for the mobile terminal to send or retrieve data (after occurrence of event E3 at the fifth waypoint 818) would be the sixth waypoint 819 when it is back in network coverage. However, the network operator might draw wrong conclusions from heavy traffic occurrences at the sixth waypoint 819. He might classify the sixth waypoint 819 as a traffic hot spot, although it actually is not one. Traffic load at the sixth waypoint 819 is in this example high just because it is the earliest opportunity for the mobile terminal to connect to the network, but the real traffic hot spot is the fifth waypoint 818 in the coverage hole 822.

The mobile terminal generates (assuming that it has been configured appropriately at the first waypoint 814) a THSM (Traffic Hot Spot Measurement) log with a location stamp (corresponding to 318 of FIG. 3). In one example the mobile terminal uses the location information that is already available in the mobile terminal, in another example the mobile terminal derives location information by kicking off a location information determining procedure (e.g., it turns on a GNSS module for a location fix).

For example when the mobile terminal is again within coverage of the mobile communication system, e.g. at the sixth waypoint 819, the mobile terminal reports the THSM log (which may be seen as a list of one or more locations) to the network, e.g. according to 319 of FIG. 3.

In addition to the location stamp, the THSM log may contain other pieces of information, e.g. clustered into two groups (one for UL and one for DL), as configured by the network operator at the first waypoint 814 in the sixth radio cell 806, such as 1. the type of application(s) generating data to be transmitted in UL direction;
2. the associated service class(es) of the application types of item 1; this may for instance be done based on one or more QCIs (QoS (Quality of Service) Class Identifiers);
3. the delay between the generation of data (i.e. the need for an UL data transmission) and the transmission of the data in UL,
4. information about the UE's transmission buffers (such as an overload indicator giving details about the amount of data that is to be transmitted but cannot be sent at the UE's current location),
5. the type of application(s) requesting data to be transmitted in DL direction,
6. the associated service class(es) of the application types of 5; this may for instance be done based on one or more QCIs,
7. the delay between the request of data (i.e. the need for a DL data transmission) and the transmission of the data in DL,
8. (an estimate of) the data volume that is requested (in case that this information is available in the UE).

For example, the UE is configured with an additional first threshold value for the delays of items 3 and 7 above. For example, only if the actual delay exceeds this first threshold value, the UE creates a THSM log. If the actual delay stays below the first threshold value it can be assumed that data generation and transmission of data in UL direction/request for data and data retrieval in downlink direction fall spatially (more or less) together so that a location stamp is not needed. There can be one first threshold value applicable for both UL and DL delay, or two distinct first threshold values one for UL delay and one for DL delay.

In another example the UE is configured with an additional second threshold value for the data volume of items 4 and 8 above. For example, only if the actual (or estimated) amount of data exceeds this second threshold value, the UE includes the data volume parameter in the THSM log. If the actual (or estimated) amount of data is below this second threshold value, it can be assumed that the data volume is insignificant for the MNO's current set of measurements and that the actual (or estimated) amount of data does not have to be included in the THSM log. There can be one second threshold value applicable for both UL and DL data volume or two distinct second threshold values one for UL data volume and one for DL data volume.

The MNO may want to improve coverage of his wireless network for instance by setting-up a macro/femto/pico base station at the location corresponding to the fifth waypoint 818 (where the actual traffic hot spot is) based on the assessment of THSM data collected by the UE. Coverage of the MNO's wireless network can also be improved by beam forming adjustments. All these different approaches may be carried out based on the detection of traffic hot spots based on the hot spot detection measurement results (e.g. the THSM log) provided by the UE.

The associated service class of an application having a need for data communication according to items 2 and 6 in the above list can be expressed in many ways. For example, use of the QoS Class Identifiers (QCIs) that are defined in 3GPP for LTE may be used. Every QCI is associated with a priority level. Priority level 1 is the highest priority level. The priority levels may be used to differentiate between SDF (Service Data Flow) aggregates of the same UE and it may also be used to differentiate between SDF aggregates from different UEs. Via its QCI an SDF aggregate is associated with a priority level and a PDB (Packet Delay Budget). Scheduling between different SDF aggregates is primarily based on the PDB. If the target set by the PDB can no longer be met for one or more SDF aggregate(s) across all UEs that have sufficient radio channel quality then priority is according to 3GPP used as follows: in this case a scheduler meets the PDB of an SDF aggregate on priority level N in preference to meeting the PDB of SDF aggregates on priority level N+1 until the priority N SDF aggregate's GBR (in case of a GBR (Guaranteed Bit Rate) SDF aggregate) has been satisfied. Table 7 gives an overview of the QoS Class Identifiers (QCIs).

TABLE 7

| CI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 |  | 4 | 150 ms | $10^{-3}$ | Conversational Video (Live Streaming) |
| 3 |  | 3 | 50 ms | $10^{-3}$ | Real Time Gaming |
| 4 |  | 5 | 300 ms | $10^{-6}$ | Non-Conversational Video (Buffered Streaming) |
| 5 | Non- | 1 | 100 ms | $10^{-6}$ | IMS Signaling |
| 6 | GBR | 6 | 300 ms | $10^{-6}$ | Video (Buffered Streaming) TCP-based (e.g., www, e-mail, chat, ftp, p2p file sharing, progressive video, etc.) |
| 7 |  | 7 | 100 ms | $0^{-3}$ | Voice, Video (Live Streaming) Interactive Gaming |
| 8 |  | 8 | 300 ms | $10^{-6}$ | Video (Buffered Streaming) TCP-based (e.g., www, e-mail, chat, ftp, p2p file sharing, progressive video, etc.) |
| 9 |  | 9 |  |  |  |

In the following, traffic hot spot detection measurement result parameters that may be included in the MDT report are described.

THSM Result Parameters in MDT Report on the UE Side

For example, RRC signaling over the air interface 106 is used to convey the traffic hot spot detection measurement results from the mobile terminal 105 back to the eNB 103. The affected RRC messages for this are:

Measurement Report RRC message

It is used for the transport of Immediate-MDT measurement results for UEs in RRC_CONNECTED, It may be sent from UE to eNodeB periodically or event triggered, It is for example transmitted in 319 from the UE 305 to the base station 304.

UE Information Response RRC Message

It is used for the transport of Logged-MDT measurement results after the respective UE has returned back to RRC_CONNECTED, It is sent from the UE to the eNodeB upon network request, It is for example transmitted in 319 from the UE 305 to the base station 304, e.g. in response to a UE Information Request transmitted from the base station 304 to the UE 305.

The Measurement Report RRC message for example has a structure as shown in table 8. The Measurement Report RRC message is generally used for the indication of measurement results. It is transmitted via the logical channel DCCH with the AM RLC-SAP. The IE measResults in line 16 which for example covers measured results for intra-frequency, inter-frequency and inter-RAT mobility has been included for the reporting of traffic hot spot detection measurements.

TABLE 8

```
1   -- ASN1START
2
3   MeasurementReport ::=          SEQUENCE {
4       criticalExtensions              CHOICE {
5           c1                              CHOICE{
6               measurementReport-r8         MeasurementReport-
                                                r8-IEs,
7               spare7 NULL,
8               spare6 NULL, spare5 NULL, spare4 NULL,
9               spare3 NULL, spare2 NULL, spare1 NULL
10          },
11          criticalExtensionsFuture         SEQUENCE { }
12      }
13  }
14
15  MeasurementReport-r8-IEs ::=   SEQUENCE {
16      measResults                     MeasResults,
17      nonCriticalExtension            MeasurementReport-
                                            v8a0-IEs
18  }
19
20  MeasurementReport-v8a0-IEs ::= SEQUENCE {
21      lateNonCriticalExtension        OCTET STRING
                                            OPTIONAL,
22      nonCriticalExtension            SEQUENCE { }
23  }
24
25  -- ASN1STOP
```

An example for the measResults IE is given in table 9, wherein the elements in lines 22 and 125 to 141 have been added for the reporting of traffic hot spot detection measurements.

TABLE 9

```
1       -- ASN1START
2
3       MeasResults ::=             SEQUENCE {
4           measId                      MeasId,
5           measResultPCell             SEQUENCE {
```

TABLE 9-continued

```
6            rsrpResult              RSRP-Range,
7            rsrqResult              RSRQ-Range
8         },
9         measResultNeighCells      CHOICE {
10           measResultListEUTRA        MeasResultListEUTRA,
11           measResultListUTRA         MeasResultListUTRA,
12           measResultListGERAN        MeasResultListGERAN,
13           measResultsCDMA2000        MeasResultsCDMA2000,
14           ...
15        }
          OPTIONAL,
16        ...,
17        [[  measResultForECID-r9    MeasResultForECID-r9
             OPTIONAL
18        ]],
19        [[  locationInfo-r10        LocationInfo-r10
             OPTIONAL,
20            measResultServFreqList-r10   MeasResultSeryFreqList-r10
             OPTIONAL
21        ]]
22        THSMResultsList           THSMResultsList
          OPTIONAL
23      }
24
25      MeasResultListEUTRA ::=     SEQUENCE (SIZE (1..maxCellReport))
        OF MeasResultEUTRA
26
27      MeasResultEUTRA ::= SEQUENCE {
28         physCellId               PhysCellId,
29         cgi-Info                 SEQUENCE {
30            cellGlobalId             CellGlobalIdEUTRA,
31            trackingAreaCode         TrackingAreaCode,
32            plmn-IdentityList        PLMN-IdentityList2
              OPTIONAL
33         }                                        OPTIONAL,
34         measResult               SEQUENCE {
35            rsrpResult               RSRP-Range
              OPTIONAL,
36            rsrqResult               RSRQ-Range
              OPTIONAL,
37            ...,
38            [[ additionalSI-Info-r9   AdditionalSI-Info-r9
              OPTIONAL
39            ]]
40         }
41      }
42
43      MeasResultServFreqList-r10 ::=   SEQUENCE (SIZE (1..maxServCell-r10)) OF
        MeasResultServFreq-r10
44
45      MeasResultServFreq-r10 ::=   SEQUENCE {
46         servFreqId-r10           ServCellIndex-r10,
47         measResultSCell-r10         SEQUENCE {
48            rsrpResultSCell-r10        RSRP-Range,
49            rsrqResultSCell-r10        RSRQ-Range
50         }                                        OPTIONAL,
51         measResultBestNeighCell-r10  SEQUENCE {
52            physCellId-r10             PhysCellId,
53            rsrpResultNCell-r10        RSRP-Range,
54            rsrqResultNCell-r10        RSRQ-Range
55         }                                        OPTIONAL,
56         ...
57      }
58
59      MeasResultListUTRA ::=      SEQUENCE (SIZE (1..maxCellReport))
        OF MeasResultUTRA
60
61      MeasResultUTRA ::=  SEQUENCE {
62         physCellId               CHOICE {
63            fdd                      PhysCellIdUTRA-FDD,
64            tdd                      PhysCellIdUTRA-TDD
65         },
66         cgi-Info                 SEQUENCE {
67            cellGlobalId             CellGlobalIdUTRA,
68            locationAreaCode         BIT STRING (SIZE (16))
              OPTIONAL,
69            routingAreaCode          BIT STRING (SIZE (8))
              OPTIONAL,
70            plmn-IdentityList        PLMN-IdentityList2
              OPTIONAL
```

TABLE 9-continued

```
71        }                                        OPTIONAL,
72        measResult                  SEQUENCE {
73           utra-RSCP                INTEGER (-5..91)
          OPTIONAL,
74           utra-EcN0                INTEGER (0..49)
          OPTIONAL,
75           ...,
76           [[  additionalSI-Info-r9      AdditionalSI-Info-r9
          OPTIONAL
77           ]]
78        }
79     }
80
81     MeasResultListGERAN ::=         SEQUENCE (SIZE (1..maxCellReport))
       OF MeasResultGERAN
82
83     MeasResultGERAN ::=SEQUENCE {
84        carrierFreq                 CarrierFreqGERAN,
85        physCellId                  PhysCellIdGERAN,
86        cgi-Info                    SEQUENCE {
87           cellGlobalId             CellGlobalIdGERAN,
88           routingAreaCode          BIT STRING (SIZE (8))
          OPTIONAL
89        }
          OPTIONAL,
90        measResult                  SEQUENCE {
91           rssi                     INTEGER (0..63),
92           ...
93        }
94     }
95
96     MeasResultsCDMA2000 ::=         SEQUENCE {
97        preRegistrationStatusHRPD    BOOLEAN,
98        measResultListCDMA2000       MeasResultListCDMA2000
99     }
100
101    MeasResultListCDMA2000 ::=      SEQUENCE (SIZE (1..maxCellReport))
       OF MeasResultCDMA2000
102
103    MeasResultCDMA2000 ::= SEQUENCE {
104       physCellId                  PhysCellIdCDMA2000,
105       cgi-Info                    CellGlobalIdCDMA2000
          OPTIONAL,
106       measResult                  SEQUENCE {
107          pilotPnPhase             INTEGER (0..32767)
          OPTIONAL,
108          pilotStrength            INTEGER (0..63),
109          ...
110       }
111    }
112
113    MeasResultForECID-r9 ::=    SEQUENCE {
114       ue-RxTxTimeDiffResult-r9     INTEGER (0..4095),
115       currentSFN-r9                BIT STRING (SIZE (10))
116    }
117
118    PLMN-IdentityList2 ::=          SEQUENCE (SIZE (1..5)) OF PLMN-
       Identity
119
120    AdditionalSI-Info-r9 ::=        SEQUENCE {
121       csg-MemberStatus-r9          ENUMERATED {member}
          OPTIONAL,
122       csg-Identity-r9              CSG-Identity
          OPTIONAL
123    }
124
125    -- Traffic Hot Spot Detection Results
126    THSMResultsList ::=             SEQUENCE {
127       THSM-UL-Results-List
128       THSM-DL-Results-List
129    }
130
131    THSM-UL-Results-List ::=    SEQUENCE (SIZE (1..maxULHotSpots)) OF
       THSMResults
132
133    THSM-DL-Results-List ::=    SEQUENCE (SIZE (1..maxDLHotSpots)) OF
       THSMResults
134
135    THSMResults ::=  SEQUENCE {
136       locationInfo-r10             LocationInfo-r10      OPTIONAL,
```

TABLE 9-continued

| | | |
|---|---|---|
| 137 | TypeOfApplication OPTIONAL, | <to be defined> |
| 138 | AssociatedServiceClass OPTIONAL, | INTEGER (1..9) |
| 139 | Delay OPTIONAL, | INTEGER (500..6000000) |
| 140 | DataVolume OPTIONAL, | INTEGER (1..5000) |
| 141 | BufferRelatedInfo OPTIONAL, | <to be defined> |
| 142 | | |
| 143 | | |
| 144 | | |
| 145 | -- ASN1STOP | |

The UEInformationResponse message for example has a structure as shown in table 10. It is transmitted via the logical channel DCCH with the AM RLC-SAP over SRB2 (when logged measurement information is included) or SRB1. The elements in lines 87 to 91 and lines 97 to 107 have been included for the reporting of traffic hot spot detection measurements.

TABLE 10

```
1   -- ASN1START
2
3   UEInformationResponse-r9 ::=        SEQUENCE {
4       rrc-TransactionIdentifier           RRC-TransactionIdentifier,
5       criticalExtensions                  CHOICE {
6           c1                                  CHOICE {
7               ueInformationResponse-r9            UEInformationResponse-r9-IEs,
8               spare3 NULL, spare2 NULL, spare1 NULL
9           },
10          criticalExtensionsFuture            SEQUENCE { }
11      }
12  }
13
14  UEInformationResponse-r9-IEs ::=    SEQUENCE {
15      rach-Report-r9                      SEQUENCE {
16          numberOfPreamblesSent-r9            INTEGER (1..200),
17          contentionDetected-r9               BOOLEAN
18      }                                                                   OPTIONAL,
19      rlf-Report-r9                       RLF-Report-r9                   OPTIONAL,
20      nonCriticalExtension                UEInformationResponse-v930-IEs
21  }
22
23  UEInformationResponse-v930-IEs ::=  SEQUENCE {
24      lateNonCriticalExtension            OCTET STRING
        OPTIONAL,
25      nonCriticalExtension                UEInformationResponse-v1020-IEs
        OPTIONAL
26  }
27
28  UEInformationResponse-v1020-IEs ::= SEQUENCE {
29      logMeasReport-r10                   LogMeasReport-r10
        OPTIONAL,
30      nonCriticalExtension                SEQUENCE { }
        OPTIONAL
31  }
32
33  RLF-Report-r9 ::=                   SEQUENCE {
34      measResultLastServCell-r9           SEQUENCE {
35          rsrpResult-r9                       RSRP-Range,
36          rsrqResult-r9                       RSRQ-Range
        OPTIONAL
37      },
38      measResultNeighCells-r9             SEQUENCE {
39          measResultListEUTRA-r9              MeasResultList2EUTRA-r9
40          measResultListUTRA-r9               MeasResultList2UTRA-r9
        OPTIONAL,
41          measResultListGERAN-r9              MeasResultListGERAN
42          measResultsCDMA2000-r9              MeasResultList2CDMA2000-r9
43      } OPTIONAL,
44      ...,
```

TABLE 10-continued

| | | |
|---|---|---|
| 45 | [[ locationInfo-r10 | LocationInfo-r10    OPTIONAL, |
| 46 | failedPCellId-r10 | CHOICE { |
| 47 | cellGlobalId-r10 | CellGlobalIdEUTRA, |
| 48 | pci-arfcn-r10 | SEQUENCE { |
| 49 | physCellId-r10 | PhysCellId, |
| 50 | carrierFreq-r10 | ARFCN-ValueEUTRA |
| 51 | } | |
| 52 | }  OPTIONAL, | |
| 53 | reestablishmentCellId-r10  OPTIONAL, | CellGlobalIdEUTRA |
| 54 | timeConnFailure-r10  OPTIONAL, | INTEGER (0..1023) |
| 55 | connectionFailureType-r10  OPTIONAL, | ENUMERATED {rlf, hof} |
| 56 | previousPCellId-r10  OPTIONAL | CellGlobalIdEUTRA |
| 57 | ]] | |
| 58 | } | |
| 59 | | |
| 60 | MeasResultList2EUTRA-r9 ::=  MeasResult2EUTRA-r9 | SEQUENCE (SIZE (1..maxFreq)) OF |
| 61 | | |
| 62 | MeasResult2EUTRA-r9 ::= | SEQUENCE { |
| 63 | carrierFreq-r9 | ARFCN-ValueEUTRA, |
| 64 | measResultList-r9 | MeasResultListEUTRA |
| 65 | } | |
| 66 | | |
| 67 | MeasResultList2UTRA-r9 ::=  MeasResult2UTRA-r9 | SEQUENCE (SIZE (1..maxFreq)) OF |
| 68 | | |
| 69 | MeasResult2UTRA-r9 ::= | SEQUENCE { |
| 70 | carrierFreq-r9 | ARFCN-ValueUTRA, |
| 71 | measResultList-r9 | MeasResultListUTRA |
| 72 | } | |
| 73 | | |
| 74 | MeasResultList2CDMA2000-r9 ::=  MeasResult2CDMA2000-r9 | SEQUENCE (SIZE (1..maxFreq)) OF |
| 75 | | |
| 76 | MeasResult2CDMA2000-r9 ::= | SEQUENCE { |
| 77 | carrierFreq-r9 | CarrierFreqCDMA2000, |
| 78 | measResultList-r9 | MeasResultsCDMA2000 |
| 79 | } | |
| 80 | | |
| 81 | LogMeasReport-r10 ::= | SEQUENCE { |
| 82 | absoluteTimeStamp-r10 | AbsoluteTimeInfo-r10, |
| 83 | traceReference-r10 | TraceReference-r10, |
| 84 | traceRecordingSessionRef-r10 | OCTET STRING (SIZE (2)), |
| 85 | tce-Id-r10 | OCTET STRING (SIZE (1)), |
| 86 | logMeasInfoList-r10 | LogMeasInfoList-r10, |
| 87 | -- Traffic Hot Spot Detection Results | |
| 88 | THSMResultsList ::= | SEQUENCE { |
| 89 | THSM-UL-Results-List | |
| 90 | THSM-DL-Results-List | |
| 91 | } | |
| 92 | logMeasAvailable-r10  OPTIONAL, | ENUMERATED {true} |
| 93 | ... | |
| 94 | } | |
| 95 | | |
| 96 | | |
| 97 | THSM-UL-Results-List ::=  THSMResults | SEQUENCE (SIZE (1..maxULHotSpots)) OF |
| 98 | | |
| 99 | THSM-DL-Results-List ::=  THSMResults | SEQUENCE (SIZE (1..maxDLHotSpots)) OF |
| 100 | | |
| 101 | THSMResults ::=   SEQUENCE { | |
| 102 | locationInfo-r10 | LocationInfo-r10                   OPTIONAL, |
| 103 | TypeOfApplication  OPTIONAL, | <to be defined> |
| 104 | AssociatedServiceClass  OPTIONAL, | INTEGER (1..9) |
| 105 | Delay  OPTIONAL, | INTEGER (500..6000000) |
| 106 | DataVolume  OPTIONAL, | INTEGER (1..5000) |
| 107 | BufferRelatedInfo  OPTIONAL, | <to be defined> |
| 108 | | |

TABLE 10-continued

```
109
110      LogMeasInfoList-r10 ::=        SEQUENCE (SIZE (1..maxLogMeasReport-r10))
         OF LogMeasInfo-r10
111
112   LogMeasInfo-r10 ::=         SEQUENCE {
113      locationInfo-r10                LocationInfo-r10           OPTIONAL,
114      relativeTimeStamp-r10           INTEGER (0..7200),
115      servCellIdentity-r10            CellGlobalIdEUTRA,
116      measResultServCell-r10          SEQUENCE {
117        rsrpResult-r10                RSRP-Range,
118        rsrqResult-r10 RSRQ-Range
119      },
120   }
121
122
123      measResultNeighCells-r10        SEQUENCE {
124        measResultListEUTRA-r10          MeasResultList2EUTRA-r9
         OPTIONAL,
125        measResultListUTRA-r10           MeasResultList2UTRA-r9
         OPTIONAL,
126        measResultListGERAN-r10          MeasResultList2GERAN-r10
         OPTIONAL,
127        measResultListCDMA2000-r10       MeasResultList2CDMA2000-r9
128      } OPTIONAL,
129      ...
130   }
131
132   MeasResultList2GERAN-r10 ::=    SEQUENCE (SIZE
         (1..maxCellListGERAN)) OF MeasResultListGERAN
133
134   -- ASN1STOP
```

THSM Result Parameters in MDT Report on the Network Side

For example, in case of Immediate-MDT, whenever the base station 304 (or the RNC) receives the MDT measurements from the UE 305 in RRC_CONNECTED, it saves it to a Trace Record.

In case of Logged MDT, the UE 305 for example collects the measurements as long as it is in RRC_IDLE. Once the UE 305 goes to RRC_CONNECTED mode, the UE 305 indicates MDT log availability in a RRCConnectionSetupComplete RRC message to the base station 304 (or the RNC). When the base station 304 (or the RNC) receives this indication it can request the MDT log (if the UE 305 is still in the same RAT type where the MDT configuration was done, or in another RAT that qualifies for MDT log retrieval) by sending a UEInformationRequest RRC message to the UE 305. The UE 305 sends the MDT logs (i.e. the MDT measurement report) to the network in the UEInformationResponse RRC message in 319. At the reception of the UEInformationResponse RRC message the base station 304 (or the RNC) saves the received MDT log.

In 320, the base station 304 (or RNC) may store the MDT measurements for later retrieval by the TCE in a Trace Record. The base station 304 may also choose to aggregate MDT UE measurements received in a measurement report 319 with MDT NW measurements collected by the base station 304 itself.

The Trace Record (e.g., containing an (aggregated) MDT measurement report) is then sent to the TCE 330 by means of a core network message sequence in 321 and 322 via the EM 301. It should be noted that there are certain deployment scenarios where the EM 301 resides inside the RNC (in case of UMTS), or inside the eNodeB 304 (in case of LTE).

The time and criteria when the Trace Records are conveyed to the EM 301 or TCE 330 may be vendor or MNO (Mobile Network Operator) specific. However, if the Trace Session is deactivated, the Trace Records is for example sent to the EM 301 or TCE 330 latest by 2 hours after the Trace Session deactivation.

In the trace-based MDT reporting at least one parameter may be added to inform the EM 301 or TCE 330 about the traffic hot spot detection measurement results. For example, the sending trace record message sequence is enhanced and additional pieces of information are added to the Trace Record message that are sent in 321 and/or 322. In doing so the MDT Reports for the traffic hot spot detection measurements use case can be propagated from the base station 304 via the EM 301 (Element Manager) in one or two steps to the TCE 330.

For this either the S1AP (defined for the S1 interface between MME 109 and eNodeB 103 in case of LTE) may be modified in order to convey the MDT Report (i.e. the THSM results) or a protocol is specified (for example defined for the interface(s) between base station 304 and TCE 330).

A possible structure for reporting the data collected during traffic hot spot detection measurements on the network side is given in table 11.

TABLE 11

| The IE defines the MDT reporting parameters. | Presence | Range | IE type | Semantics description |
|---|---|---|---|---|
| . | . | . | . | . |
| . | . | . | . | . |
| . | | | | |
| THSM | | | | |
| >UL | O | | | Container for uplink related THSM parameters. |
| >>Hot Spot Number | O | | | Used to provide a record identifier (Traffic Hot Spot Identifier) for the each set of measurement results (i.e. for each detected UL Traffic Hot Spot). |

TABLE 11-continued

| The IE defines the MDT reporting parameters. | Presence | Range | IE type | Semantics description |
|---|---|---|---|---|
| >>>Location Stamp | O | | | Used to report location information for the corresponding record. |
| >>>Application | O | | | Used to report the type of application for the corresponding record. |
| >>>Service Class | O | | | Used to report the service class (e.g., the QCI) for the corresponding record. |
| >>>Data Volume | O | | | Used to report the amount of UL data that couldn't be transmitted for the corresponding record. |
| >>>Delay until first transmission | O | | | Used to report the delay UL data experienced for the corresponding record. |
| >DL | O | | | Container for downlink related THSM parameters. |
| >>Hot Spot Number | O | | | Used to provide a record identifier (Traffic Hot Spot Identifier) for the each set of measurement results (i.e. for each detected DL Traffic Hot Spot). |
| >>>Location Stamp | O | | | Used to report location information for the corresponding record. |
| >>>Application | O | | | Used to report the type of application for the corresponding record. |
| >>>Service Class | O | | | Used to report the service class (e.g., the QCI) for the corresponding record. |
| >>>Data Volume | O | | | Used to report (an estimate of) the amount of DL data that couldn't be retrieved for the corresponding record. |
| >>>Delay until first reception | O | | | Used to report the delay DL data experienced for the corresponding record. |
| . | . | . | . | . |
| . | . | . | . | . |
| . | . | . | . | . |

Regarding the propagation of the traffic hot spot detection measurement configuration, the traffic hot spot detection measurement is for example made an integral part of the MDT configuration. Thus, in case of Immediate-MDT the traffic hot spot detection measurement configuration parameters for a UE are for example transferred from a source eNB/RNC (i.e. a source cell) to a target eNB/RNC (i.e. a target cell), e.g. in case of a handover, as follows:

The eNB/RNC activates the Immediate-MDT in the UE if the area based selection conditions are satisfied or—after a handover that is made over X2 or S1 (or over Iur or Iu in case of UMTS)—in the target cell. If the area based selection conditions are not satisfied in the handover target cell, the eNB/RNC may deactivate the Immediate-MDT operations in the UE. The trace sessions and trace recording sessions are for example not visible for the UE.

In case of signaling based trace activation (subscription based MDT), the eNB/RNC propagates the Trace Session parameters together with the MDT specific parameters (including the parameters for the traffic hot spot detection measurements) to the target cell regardless of whether the source or target cell is part of the configured area scope in case of an Intra-PLMN handover over X2 or S1 (or Iur or Iu in case of UMTS).

In case of UTRAN the RNC propagates the Trace Session of the UE to the target cell in case of a handover over Iur or Iu. Any trace recording session is maintained, stopped or started in the target cell according to the evaluation of the selection criteria. This includes the behavior and parameters for the traffic hot spot detection measurements.

In Logged-MDT mode, no propagation of the MDT configuration is for example performed.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a message generator configured to generate a measurement configuration information element (IE) in a radio resource configuration (RRC)connection reconfiguration message to indicate that a mobile terminal is to determine a list of locations at which the mobile terminal has detected an unmet need for a data communication with a mobile communication network and a type of an application running on the mobile terminal requiring the data communication at each location of the list of locations, and to transmit the determined list of locations and types of applications to the mobile communication network; and
    a transmitter configured to transmit the RRC connection reconfiguration message.

2. The communication device according to claim 1, the transmitter configured to transmit the message to the mobile terminal.

3. The communication device according to claim 1, wherein the RRC connection reconfiguration message is to indicate that the mobile terminal is to determine a list of locations at which the mobile terminal has detected an unmet need for a data communication with the mobile communication network and at which a data communication with the mobile communication network has not been carried out and to transmit the determined list of locations to the mobile communication network.

4. The communication device according to claim 1, wherein the RRC connection reconfiguration message is to indicate that the mobile terminal is to determine a list of locations at which the mobile terminal has detected an unmet need for a data communication with the mobile communication network and at which a data communication with the mobile communication network has not been possible and to transmit the determined list of locations to the mobile communication network.

5. The communication device according to claim 1, wherein the RRC connection reconfiguration message is to indicate that the mobile terminal is to determine a list of locations at which the mobile terminal has detected an unmet need for a data communication with the mobile communication network and at which there is no coverage by the mobile communication network and to transmit the determined list of locations to the mobile communication network.

6. The communication device according to claim 1, wherein the RRC connection reconfiguration message is to indicate that the mobile terminal is to determine a list of locations at which the mobile terminal has detected an unmet need for a data communication with the mobile communication network and at which a communication connection to the mobile communication network has not been available for the mobile terminal and to transmit the determined list of locations to the mobile communication network.

7. The communication device according to claim 1, wherein the message indicates that the mobile terminal is to determine a list of locations at which the mobile terminal has detected an unmet need for a data communication with the mobile communication network and at which a data communication with the mobile communication network has not been possible due to overload situations on the air interface and to transmit the determined list of locations to the mobile communication network.

8. The communication device according to claim 1, wherein the message indicates that the mobile terminal is to further provide, for at least one of the determined locations,
a class of a communication service requiring the data communication at the at least one determined location; or
an indication of the volume of data that needs to be communicated in the data communication at the at least one determined location.

9. The communication device according to claim 1, wherein the RRC connection reconfiguration message is to indicate that the mobile terminal is to determine a list of locations at which the mobile terminal has detected an unmet need for a data communication with the mobile communication network and at which the delay between the time of the detection of the need for the data communication and the time of carrying out the data communication is above a predetermined delay threshold and to transmit the determined list of locations to the mobile communication network.

10. The communication device according to claim 9, wherein the predetermined delay threshold is specified in the RRC connection reconfiguration message.

11. The communication device according to claim 1, wherein the RRC connection reconfiguration message is to indicate that the mobile terminal is to determine a list of locations at which the mobile terminal has detected an unmet need for a data communication with the mobile communication network and at which the volume of data that needs to be communicated in the data communication is above a predetermined volume threshold and transmit the determined list of locations to the mobile communication network.

12. The communication device according to claim 11, wherein the predetermined volume threshold is specified in the RRC connection reconfiguration message.

13. The communication device according to claim 1, wherein the data communication is an uplink data communication, a downlink data communication or both.

14. The communication device according to claim 13, wherein the data communication is the exchange of data over the air interface of a cellular mobile communication system.

15. The communication device according to claim 1, wherein the message indicates that the mobile terminal is to log locations of the mobile terminal at which the mobile terminal detects an unmet need for a data communication with the mobile communication network.

16. The communication device according to claim 15, wherein the message indicates that the mobile terminal is to log locations of the mobile terminal at which the mobile terminal detects an unmet need for a data communication with the mobile communication network and at which a data communication with the mobile communication network has not been carried out.

17. The communication device of claim 1, wherein the communication device is part of the mobile communication network.

18. The communication device of claim 1, wherein the communication device is a base station.

19. The communication device of claim 1, the message generator configured to generate the message m accordance with Minimization of Drive Tests and the transmitter configured to transmit the message in accordance with Minimization of Drive Tests.

20. The communication device according to claim 1, the communication device being part of the mobile communication network and the transmitter configured to transmit the message to another communication device of the mobile communication network.

21. A method for requesting information comprising:
generating a measurement configuration information element (IE) in a radio resource configuration (RRC) connection reconfiguration message to indicate that a mobile terminal is to determine a list of locations at which the mobile terminal has detected an unmet need for a data communication with a mobile communication network and a type of an application running on the mobile terminal requiring the data communication at each location of the list of locations, and to transmit the determined list of locations and types of applications to the mobile communication network; and
transmitting the RRC connection reconfiguration message.

22. The method according to claim 21, comprising transmitting the RRC connection reconfiguration message to the mobile terminal.

23. A mobile terminal comprising:
a receiver configured to receive a measurement configuration information element (IE) in a radio resource control (RRC) connection reconfiguration message from a communication device to indicate that the mobile terminal is to determine a list of locations at which the mobile terminal has detected an unmet need for a data communication with a mobile communication network and a type of an application running on the mobile terminal requiring the data communication at each location of the list of locations, and to transmit the determined list of locations to the mobile communication network;
a detector configured to detect whether the mobile terminal has a need for a data communication with a mobile communication network;
a determiner configured to determine the list of locations at which the detector has detected a need for data communication with the mobile communication network and the type of an application running on the mobile terminal requiring the data communication at each location of the list of locations;
a message generator configured to generate a message including the determined list and types of applications; and
a transmitter configured to transmit the message.

24. The mobile terminal according to claim 23, wherein the RRC connection reconfiguration message is to indicate that the mobile terminal is to determine a list of locations at which the mobile terminal has detected a need for a data communication with the mobile communication network and at which the delay between the time of the detection of the need for the data communication and the time of carrying out the data communication is above a predetermined delay threshold, specified in the RRC connection reconfiguration message, and to transmit the determined list of locations to the mobile communication network.

25. The mobile terminal according to claim 23, wherein the RRC connection reconfiguration message is to indicate that the mobile terminal is to determine a list of locations at which the mobile terminal has detected a need for a data communication with the mobile communication network and at which the volume of data that needs to be communicated in the data communication is above a predetermined volume threshold, specified in the RRC connection reconfiguration message, and transmit the determined list of locations to the mobile communication network.

26. A method for providing information comprising:
receiving a measurement configuration information element (IE) in a radio resource control (RRC) connection reconfiguration message from a communication device to indicate that a mobile terminal is to determine a list of locations at which the mobile terminal has detected an unmet need for a data communication with a mobile communication network and a type of an application running on the mobile terminal requiring the data communication at each location of the list of locations, and to transmit the determined list of locations to the mobile communication network;
detecting whether the mobile terminal has a need for a data communication with a mobile communication network;
determining a list of locations at which a need for data communication with the mobile communication network has been detected and the type of application running on the mobile terminal requiring the data communication at each location of the list of locations;
generating a message including the determined list and types of applications; and
transmitting the message.

27. The method according to claim 26, wherein the RRC connection reconfiguration message is to indicate that the mobile terminal is to determine a list of locations at which the mobile terminal has detected a need for a data communication with the mobile communication network and at which the delay between the time of the detection of the need for the data communication and the time of carrying out the data communication is above a predetermined delay threshold, specified in the RRC connection reconfiguration message, and to transmit the determined list of locations to the mobile communication network.

* * * * *

UNITED STATES PATENT AND TRADEMARK OFFICE
CERTIFICATE OF CORRECTION

PATENT NO. : 8,891,396 B2
APPLICATION NO. : 13/658840
DATED : November 18, 2014
INVENTOR(S) : Andreas Schmidt et al.

It is certified that error appears in the above-identified patent and that said Letters Patent is hereby corrected as shown below:

In the claims

Column 46, line 25 (Claim 1): Replace "(RRC)connection" with --(RRC) connection--; and Column 48, line 7 (Claim 19): Replace "m accordance" with --in accordance--.

Signed and Sealed this
Ninth Day of August, 2016

Michelle K. Lee
*Director of the United States Patent and Trademark Office*